US008862371B2

(12) United States Patent
Takata et al.

(10) Patent No.: US 8,862,371 B2
(45) Date of Patent: Oct. 14, 2014

(54) ENGINE CONTROL APPARATUS

(75) Inventors: Michihiro Takata, Chiyoda-ku (JP);
Masaharu Yuhara, Chiyoda-ku (JP);
Yuji Zushi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1258 days.

(21) Appl. No.: 12/684,434

(22) Filed: Jan. 8, 2010

(65) Prior Publication Data
US 2010/0256897 A1  Oct. 7, 2010

(30) Foreign Application Priority Data

Apr. 2, 2009  (JP) .................................. 2009-090281

(51) Int. Cl.
G06F 19/00 (2011.01)
F02N 11/08 (2006.01)
B60R 25/04 (2013.01)
F02N 11/10 (2006.01)
F02D 41/20 (2006.01)

(52) U.S. Cl.
CPC .......... F02N 11/103 (2013.01); F02D 2400/08 (2013.01); B60R 25/04 (2013.01); F02D 2041/2027 (2013.01); F02N 11/0862 (2013.01)
USPC ...................... 701/113; 123/179.1; 123/179.3; 307/10.6

(58) Field of Classification Search
CPC ................................................ F02N 2200/063
USPC ............... 701/113; 361/92; 123/179.1, 179.3; 307/10.6
See application file for complete search history.

(56) References Cited

U.S. PATENT DOCUMENTS

| 5,252,861 | A | * | 10/1993 | Steeby et al. ................. 307/10.6 |
| 5,848,577 | A | * | 12/1998 | Sappe et al. ................. 123/179.3 |
| 6,681,736 | B2 | * | 1/2004 | Sumimoto et al. ......... 123/179.3 |
| 7,677,216 | B2 | * | 3/2010 | Sugano et al. ............. 123/179.3 |

FOREIGN PATENT DOCUMENTS

| JP | 10-103460 A | 4/1998 |
| JP | 2001-349268 A | 12/2001 |
| JP | 2002-174162 A | 6/2002 |
| JP | 2002-195138 A | 7/2002 |
| JP | 2003-193879 A | 7/2003 |
| JP | 2003214306 A | 7/2003 |
| JP | 2005-178475 A | 7/2005 |
| JP | 2006-248471 A | 9/2006 |
| JP | 2006-349447 A | 12/2006 |
| JP | 2007-162676 A | 6/2007 |
| JP | 2007-327395 A | 12/2007 |

* cited by examiner

Primary Examiner — Mahmoud Gimie
Assistant Examiner — David Hamaoui
(74) Attorney, Agent, or Firm — Sughrue Mion, PLLC

(57) ABSTRACT

Even when, due to an abnormal decrease in the battery voltage, an engine control apparatus is inoperative, an engine can safely be started. Based on gearshift lever selection position information generated by a gearshift sensor (109A), a first detection circuit (194) generates a first detection signal PS1 when the gearshift lever is in the neutral position or in the parking position; a microprocessor (110A) is provided with a second detection means that generated a second detection signal PS2 when the gearshift lever is in the neutral position or in the parking position. Even when, due to an abnormal decrease in the voltage of a vehicle battery, the microprocessor (110A) is inoperative, by ascertaining through the first detection signal PS1 that the vehicle is in a state of not being driven, the engine can be started by means of a starting switch.

6 Claims, 8 Drawing Sheets

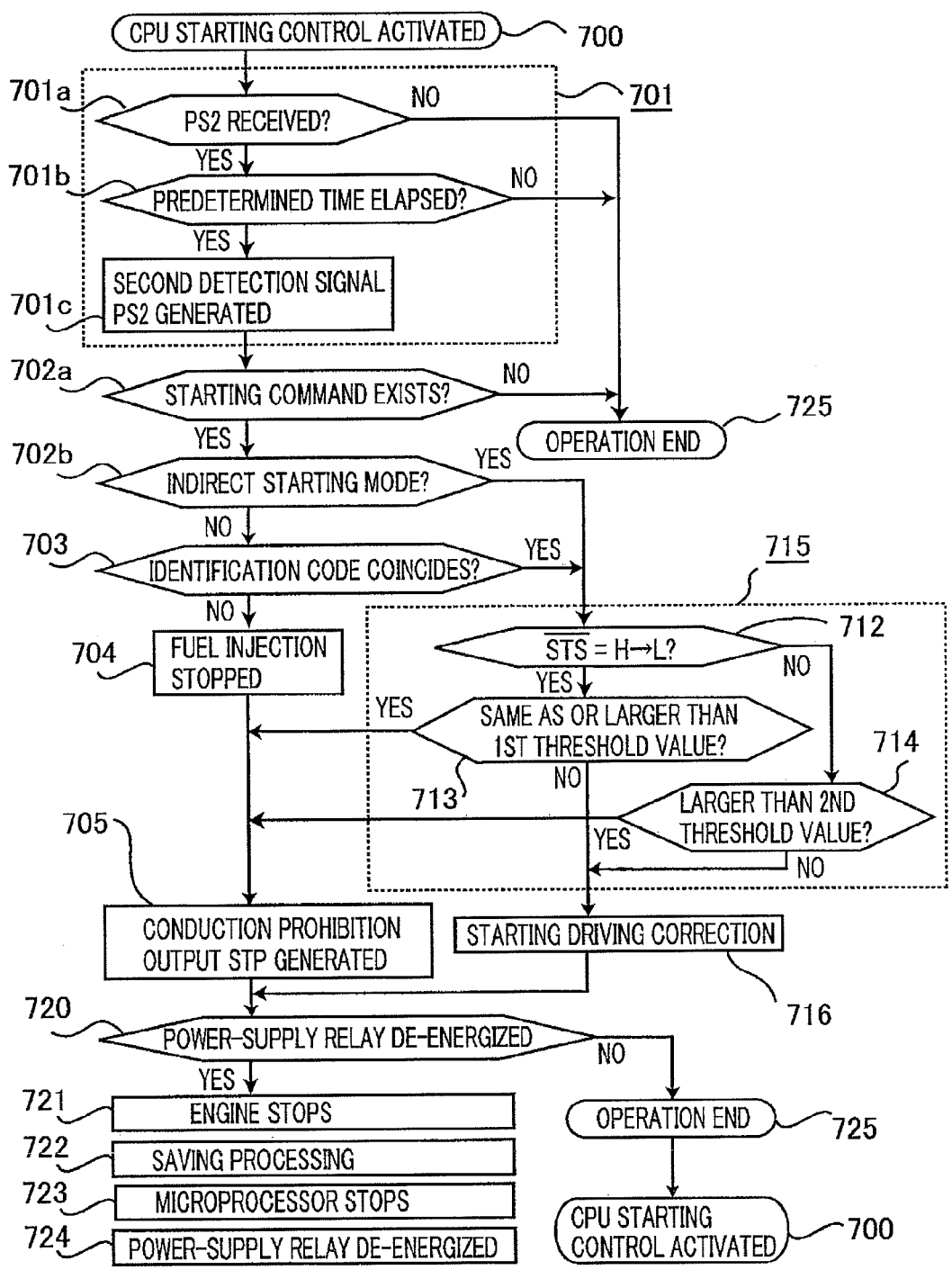

ENGINE CONTROL APPARATUS

BACKGROUND OF THE INVENTION

1. Field of the Invention

The present invention relates to an engine control apparatus and particularly to an engine control apparatus that raises the reliability of a gearshift position signal obtained from a gearshift sensor so that an engine can more safely be started.

2. Description of the Related Art

A vehicle engine is not configured in such a simple manner that just closing the starting switch makes the starter motor rotate to start the engine; the engine is started through close relationship with an engine control apparatus that incorporates a microprocessor.

The foregoing engine control apparatus reads an identification code given to an engine starting operation key so as to perform control related to prevention of vehicle theft utilizing an operation key in an improper manner. Additionally, in cold regions, the engine control apparatus may perform control related to remote starting of an engine by a wireless signal instead of an engine starting operation key. Furthermore, the foregoing engine control apparatus may be utilized to perform control in which, for the purpose of energy-saving driving, when a first appropriate condition is satisfied, supply of the fuel is automatically interrupted to stop the engine, and when a second appropriate condition is satisfied, the engine is automatically restarted.

In these diverse methods for starting control, it is important to determine whether or not there has been selected a vehicle-transmission setting position at which the vehicle cannot be driven. Specifically, in the case of an automatic transmission, when the gearshift lever is in the neutral position or the parking position, the vehicle cannot be driven; additionally, in the case of a manual transmission, when the gearshift lever is in the neutral position, the vehicle cannot be driven.

Accordingly, after a signal from a gearshift sensor is inputted to a microprocessor and it is ascertained that the gearshift lever is in the neutral position or in the parking position, the engine is allowed to be started.

For example, in an apparatus disclosed in Patent Document 1, as a requirement for automatic restarting of an engine, a neutral switch signal from the transmission is applied. Additionally, in an apparatus disclosed in Patent Document 2, by determining whether or not the gearshift of a transmission is in a position where the vehicle cannot travel, remote starting is allowed. Additionally, in an apparatus disclosed in Patent Document 3, even in the case of direct starting through a starting switch, there is utilized a neutral switch signal as a requirement for starting.

On the other hand, in a bad environment where a vehicle battery as a power source for a starter motor is not sufficiently charged and the ambient temperature is low, in the case where there occurs an emergent situation in which, due to an excessive load current at a time immediately after the drive of the starter motor is initiated, the voltage of the vehicle battery is abnormally lowered and hence an engine control apparatus cannot be operated, there is required a means that backs up the engine control apparatus in such a way that the operation of the starter motor is continued without relying on the engine control apparatus, the load current is decreased and hence the voltage of the vehicle battery recovers, and then the operation of the engine control apparatus is resumed. For example, for an apparatus disclosed in Patent Document 4, there has been disclosed a means that allows an engine to be started even in the case where there exists no authentication approving determination for preventing a theft, and then in the case where the result of an authentication determination becomes "unallowable", starting control and ignition control are stopped. However, in the apparatus disclosed in Patent Document 4, the behavior of the gearshift sensor is not described.

In each of the foregoing apparatuses disclosed in Patent Documents described above, a plurality of fixed contacts corresponding to gearshift positions, a variable resistor, a non-contact linear sensor, or the like is utilized as a gearshift sensor. For example, in an apparatus disclosed in Patent Document 5, by utilizing a plurality of fixed contacts corresponding to gearshift positions and resistor circuitry, a gearshift sensor equivalent to a variable resistor is configured so as to generate output voltages corresponding to gearshift positions that are inputted to a microprocessor via an AD converter provided in a control apparatus for an internal combustion engine. Additionally, in Patent Document 6, there is provided a non-contact magnetic sensor that generates signal voltages corresponding to the shift positions of a gearshift lever.

PATENT DOCUMENTS

[Patent Document 1] Japanese Patent Application Laid-Open No. 2003-193879 (Abstract and FIG. 1)
[Patent Document 2] Japanese Patent Application Laid-Open No. 2006-248471 (Abstract and FIG. 3)
[Patent Document 3] Japanese Patent Application Laid-Open No. 2001-349268 (Abstract and FIG. 1)
[Patent Document 4] Japanese Patent Application Laid-Open No. 2005-178475 (Abstract and FIG. 2)
[Patent Document 5] Japanese Patent Application Laid-Open No. H10-103460 (Abstract and FIG. 1)
[Patent Document 6] Japanese Patent Application Laid-Open No. 2006-349447 (Abstract and FIG. 3)

In an apparatus disclosed in Patent Document 1, a system is configured based on the assumption that, when, due to an abnormal decrease in the battery voltage, the engine control apparatus does not work, automatic starting of the engine is not performed; similarly, in an apparatus disclosed in Patent Document 2, a system is configured based on the assumption that, when, due to an abnormal decrease in the battery voltage, the engine control apparatus does not work, remote starting of the engine is not performed.

Also in an apparatus disclosed in Patent Document 3, as is the case with respective apparatuses disclosed in Patent Documents 1 and 2, a neutral signal is inputted to a microprocessor. Accordingly, it is not clearly described how the engine is started in the case where each of the apparatuses disclosed in Patent Documents 1, 2, and 3 should be directly started through operation of a starting switch, but due to an abnormal decrease in the battery voltage, the engine control apparatus does not work; therefore, the engine cannot be started.

In contrast, in an apparatus disclosed in Patent Document 4, even when, due to an abnormal decrease in the battery voltage, the engine control apparatus does not work, the engine can be started by means of a starting switch; however, because there exists no function of monitoring the state of the transmission when the starting of the engine is controlled, there has been a problem that starting with the gear engaged poses an abrupt move of the vehicle, or the starter motor's capability of moving the vehicle raises the risk of theft.

Also in an apparatus disclosed in Patent Document 5, as is the case with respective apparatuses disclosed in Patent Documents 1, 2, and 3, a gearshift signal is inputted to a microprocessor; therefore, it is not clearly described how the engine is started in the case where each of the apparatuses disclosed in Patent Documents 1, 2, and 3 should be directly started through operation of a starting switch, but due to an abnormal decrease in the battery voltage, the engine control apparatus does not work; therefore, the engine cannot be started.

Moreover, Patent Document 6 does not disclose how a signal from a non-contact linear sensor is dealt with; the apparatus disclosed in Patent Document 6 contributes to raising the reliability of the gearshift sensor itself.

SUMMARY OF THE INVENTION

The first objective of the present invention is to provide an engine control apparatus that makes it possible to directly start the engine by means of a starting switch even when, due to an abnormal decrease in the battery voltage, the engine control apparatus does not work, and that prevents the engine from being started unless the selection position of the transmission selector lever is the neutral position or the parking position, regardless of whether or not the engine control apparatus works, and regardless of direct starting by means of the starting switch, automatic starting without utilizing the starting switch, and indirect starting such as remote starting.

The second objective of the present invention is to provide an engine control apparatus that has a simple, double-system signal processing means for selector lever selection position information so as to raise the safety of engine starting control.

An engine control apparatus according to the present invention is provided with a microprocessor that drives and controls a group of electric loads including an electromagnetic relay that drives at least a starter motor for an engine, in response to an operation state of a group of input sensors including a starting switch for the engine and a gearshift sensor that creates position information on a gearshift lever of a vehicle transmission and to contents of a control program stored in a program memory; a first detection circuit that detects at least one or both of a state where the transmission is in a neutral position and a state where the transmission is in a parking position, based on the position information on the gearshift lever generated by the gearshift sensor, and that generates a first detection signal; a second detection means in which there are detected at least one or both of the state where the transmission is in the neutral position and the state where the transmission is in the parking position, based on the position information, and then the microprocessor generates a second detection signal; and a direct driving circuit that is connected in series with the starting switch and energizes the electromagnetic relay so that a vehicle battery supplies the starter motor with electric power when at least one of the first detection signal and the second detection signal are outputted because the neutral position or the parking position is detected. The direct driving circuit continues to energize the electromagnetic relay even when, due to an abnormal decrease in the voltage of the vehicle battery, the microprocessor is inoperative, and starts the engine as long as the first detection signal is generated, even when the second detection signal is not generated.

An engine control apparatus according to the present invention is provided with a microprocessor that drives and controls a group of electric loads including an electromagnetic relay that drives at least a starter motor for an engine, in response to an operation state of a group of input sensors including a starting switch for the engine and a gearshift sensor that creates position information on a gearshift lever of a vehicle transmission and to contents of a control program stored in a program memory; a first detection circuit that detects at least one or both of a state where the transmission is in a neutral position and a state where the transmission is in a parking position, based on the position information on the gearshift lever generated by the gearshift sensor, and that generates a first detection signal; a second detection means in which there are detected at least one or both of the state where the transmission is in the neutral position and the state where the transmission is in the parking position, based on the position information, and then the microprocessor generates a second detection signal; and a direct driving circuit that is connected in series with the starting switch and energizes the electromagnetic relay so that a vehicle battery supplies the starter motor with electric power when at least one of the first detection signal and the second detection signal are outputted because the neutral position or the parking position is detected. The direct driving circuit continues to energize the electromagnetic relay even when, due to an abnormal decrease in the voltage of the vehicle battery, the microprocessor is inoperative, and starts the engine as long as the first detection signal is generated, even when the second detection signal is not generated; therefore, it is made possible that the engine is directly started by means of the starting switch even when, due to an abnormal decrease in the battery voltage, the engine control apparatus is inoperative, and even when the second detection signal, which depends on the operation of the microprocessor, is not generated, the first detection signal, which does not depend on the operation of the microprocessor, makes it possible to safely and securely start an engine. Therefore, the safety in starting an engine can be enhanced.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 7 is a flowchart for explaining the operation of a microprocessor in an engine control apparatus according to Embodiment 2 of the present invention.

DETAILED DESCRIPTION OF THE PREFERRED EMBODIMENTS

Preferred embodiments of an engine control apparatus according to the present invention will be explained below with reference to the accompanying drawings. In addition, the present invention is not limited to the embodiments.

Embodiment 1

Figure 1:
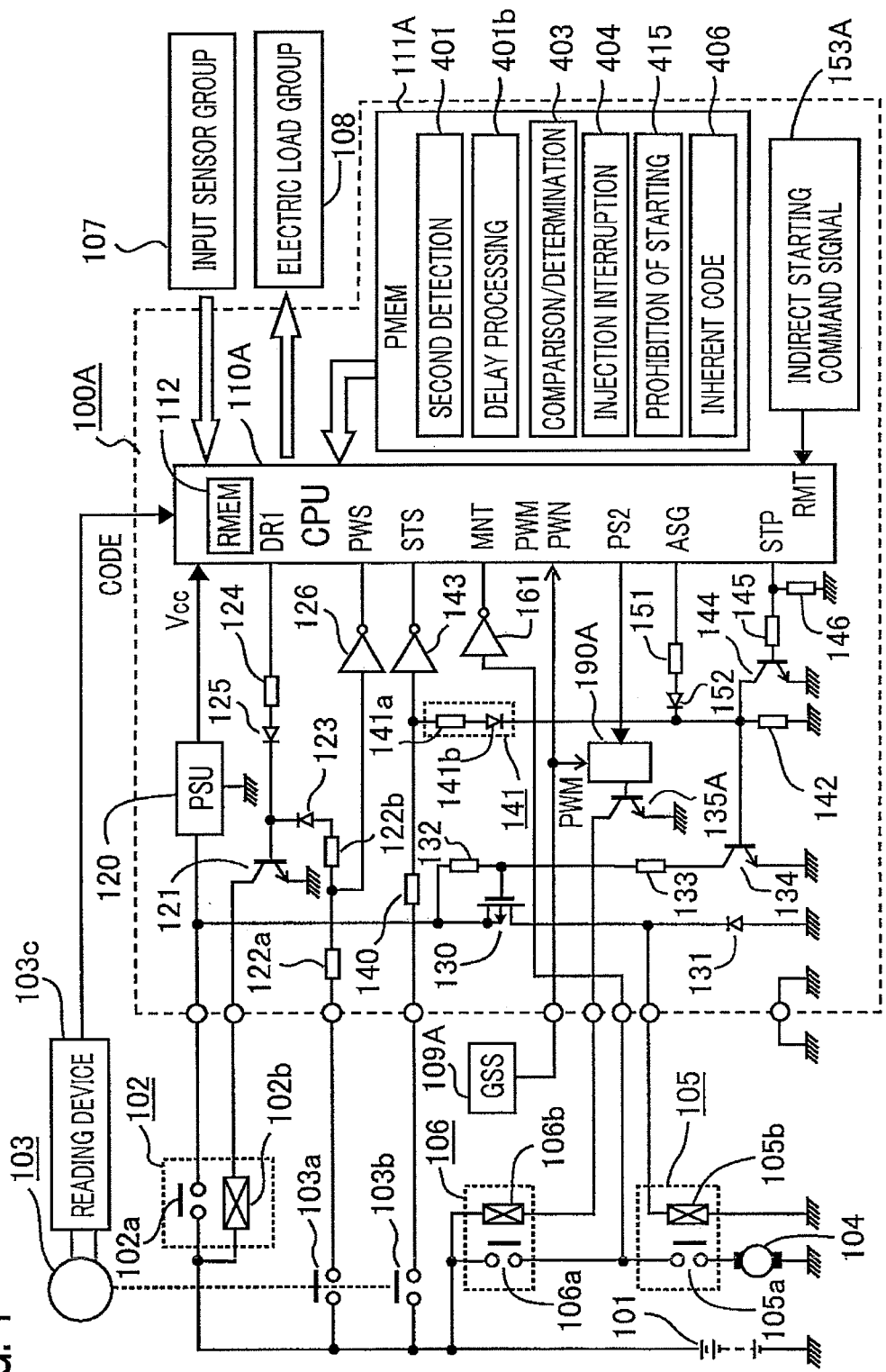
FIG. 1 is a circuit block diagram for explaining an engine control apparatus according to Embodiment 1 of the present invention.

FIG. 1 is a circuit block diagram for explaining an engine control apparatus according to Embodiment 1 of the present invention.

In FIG. 1, a vehicle battery 101 is connected with an engine control apparatus 100A via an output contact 102a of a power supply relay 102; an excitation coil 102b of the power supply relay 102 is driven by a driving transistor 121 described later. A power switch 103a connected with the engine control apparatus 100A is closed at second and third pivotal positions of an operation key 103; a starting switch 103b is closed at the third pivotal position. A reading device 103c reads an identification code added to the operation key 103 and inputs the identification code to a microprocessor 110A.

A starter motor 104 is supplied with electric power by the vehicle battery 101 via an output contact 105a of an electromagnetic relay 105 and a second output contact 106a described later, and is engaged with a ring gear of an engine through an unillustrated electromagnetic push-out mechanism to drive and rotate an engine; an excitation coil 105b of the power supply relay 105 is supplied with electric power and energized via a serial switching element 130 described later. In addition, the serial switching element 130 is formed of a P-channel field-effect transistor.

When an excitation coil 106b of a serial electromagnetic relay 106 is supplied with electric power and energized via a safety driving transistor 135A, the second output contact 106a connected in series with the output contact 105a is closed.

A group of input sensors 107 whose output signals are inputted to the microprocessor 110A through unillustrated interface circuits includes various types of sensors, for monitoring the operation status of the engine, such as an airflow sensor that measures the air intake amount of an engine, an accelerator position sensor that detects the depression degree of the acceleration pedal, a throttle position sensor that detects the opening degree of a throttle, and an engine crank angle sensor.

A group of electric loads 108 supplied with electric power and driven by the microprocessor 110A through unillustrated interface circuits includes, for example, a driving electromagnetic coil for a fuel injection valve, an ignition coil of the engine (in the case of a gasoline engine), an opening degree control motor for an air-intake throttle, a driving motor for an exhaust circulation valve, an electromagnetic clutch for an air conditioner, and an alarm display device.

Figure 2:
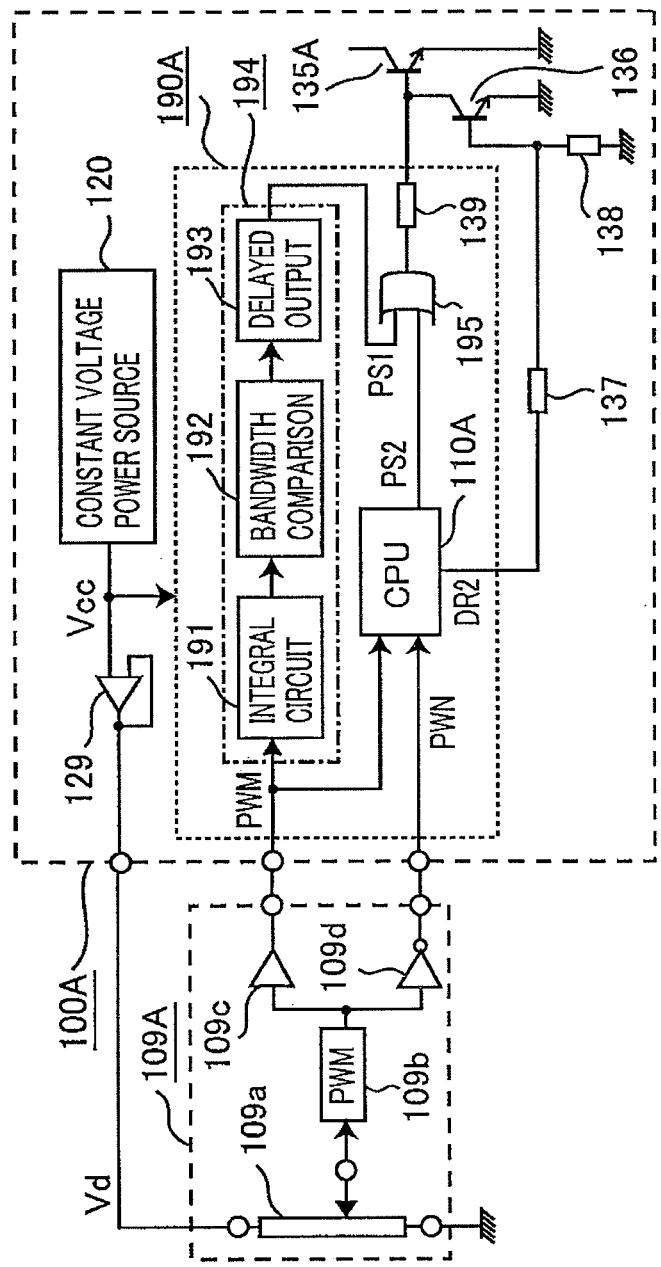
FIG. 2 is a partially detailed diagram related to signal processing by a gearshift sensor in an engine control apparatus according to Embodiment 1 of the present invention.

A gearshift sensor 109A generates positional information corresponding to the selection position of the gearshift lever for an unillustrated vehicle transmission, and supplies a pulse-width modulation signal PWM and its logic inverted signal PWN to a gearshift detection circuit 190A to be explained with reference to FIG. 2.

The microprocessor 110A, a program memory 111A, which is, for example, a nonvolatile flash memory, and a RAM memory 112 for calculation processing are connected with one another through bus lines so as to collaborate with one another. In the program memory 111A, there are stored inherent code data 406 for identifying an identification code, and a control program, to be explained with reference to FIGS. 4A and 4B, that forms a comparison determination means 403, a fuel-injection interruption means 404, a double-starting prohibition means 415, a second detection means 401, and a delaying processing means 401b, in addition to an input/output control program as the engine control apparatus 100A.

A control power supply unit 120 is supplied with electric power via the output contact 102a of the power supply relay 102, generates a control voltage Vcc (=5V) based on the power-source voltage (DC 10 to DC 16 V) of the vehicle battery 101, and supplies a stabilized voltage to respective units such as the microprocessor 110A and the like.

The driving transistor 121 that energizes the excitation coil 102b is supplied with a base current by the power switch 103a via driving resistors 122a and 122b and a diode 123 that are connected in series with one another, and hence is turned on so as to close the output contact 102a of the power supply relay 102. The output contact 102a is closed and the control power supply unit 120 is supplied with electric power, so that the microprocessor 110A starts to operate; then, in accordance with a self-holding driving command DR1 generated by the microprocessor 110A, a base current of the driving transistor 121 is supplied via a self-holding driving resistor 124 and a diode 125. After that, because, even when the power switch 103a is closed, the power supply relay 102 continues its energizing operation, the microprocessor 110A stops issuing the self-holding driving command DR1; therefore, the power-supply relay 102 is de-energized.

A NOT logic device 126 generates a power switch on/off state monitoring signal PWS whose logic level becomes "L"/ "H" in accordance with the high/low state of the electric potential at the connection point between the driving resistors 122a and 122b, i.e., the on/off state of the power switch 103a, and inputs the power switch on/off state monitoring signal PWS to the microprocessor 110A.

The serial switching element 130 that is supplied with electric power through the output contact 102a of the power supply relay 102 is connected with the excitation coil 105b; a commutation diode 131 is connected in parallel with the excitation coil 105b. An open-circuit stabilizing resistor 132 is connected between the source terminal and the gate terminal of a serial switching element 130, which is a P-cannel field-effect transistor; the gate terminal of the serial switching element 130 is connected with the ground via a conduction driving resistor 133 and a conduction driving transistor 134. In addition, the conduction driving transistor 134 is formed of an NPN-type field-effect transistor.

The conduction driving transistor 134 is supplied with a base current by the starting switch 103b via direct starting resistors 140 and 141a and a diode 141b that are connected in series with one another, and hence is turned on so as to energize the electromagnetic relay 105 via the serial switching element 130. The direct starting resistor 141a and the diode 141b configure a direct driving circuit 141; a stabilizing resistor 142 is connected between the base terminal and the emitter terminal of the conduction driving transistor 134, which is an NPN-type field-effect transistor.

The safety driving transistor 135A that drives the excitation coil 106b of the serial electromagnetic relay 106 is driven by the gearshift detection circuit 190A, and is turned on when the vehicle transmission is in the neutral position or the parking position.

A NOT logic device 143 generates a starting command monitoring signal STS whose logic level becomes "L"/"H" in accordance with the high/low state of the electric potential at the connection point between the direct starting resistors 140 and 141a, i.e., the on/off state of the starting switch 103b, and inputs the starting command monitoring signal STS to the microprocessor 110A.

A prohibition transistor 144 connected between the base terminal and the emitter terminal of the conduction driving transistor 134 is driven via a base resistor 145, by means of a conduction prohibition command output STP generated by the microprocessor 110A; when the identification code is not authenticated, or while the engine rotates, the prohibition transistor 144 turns on to make the conduction driving transistor 134 nonconductive, thereby de-energizing the electromagnetic relay 105. In addition, when the microprocessor 110A is in a non-operating state, the prohibition transistor 144 is made nonconductive because of a pull-down resistor 146.

As an indirect starting command output ASG, an output signal of a logic level "H" is generated in response to an indirect starting command signal 153A so as to supply the transistor 134 with a base current via driving resistors 151 and 152, for example, in the case where an unillustrated reception circuit for a remote starting apparatus is connected in series to the microprocessor 110A and an engine starting command is received from the reception circuit, or in the case where automatic starting driving is performed after idling is interrupted. As a result, the serial switching element 130 is turned on to energize the electromagnetic relay 105, whereby the starter motor 104 is driven to rotate. The electric potential of the connection point between the second output contact 106a and the output contact 105a is inputted, as a contact operation monitoring signal MNT, to the microprocessor 110A via an interface circuit 161.

Next, signal processing by the gearshift sensor for the engine control apparatus according to Embodiment 1 will be explained with reference to FIG. 2, i.e., a partial detailed diagram. In FIG. 2, the engine control apparatus 100A supplies the gearshift sensor 109A with a sensor driving voltage Vd via a buffer amplification 129 provided in the output circuit of the control power supply unit 120 that is supplied with electric power by the vehicle battery 101 and generates a stabilized control voltage Vcc. The buffer amplification 129 protects the control power supply unit 120 from being damaged when the power-supply lead wire for driving the gearshift sensor undergoes earth-fault abnormality.

The gearshift sensor 109A is configured with a variable resistor 109a that generates a signal voltage corresponding to the selection position of the gearshift lever, a PWM conversion circuit 109b that generates a constant-cycle pulse train signal having an ON-width in proportion to the output voltage of the variable resistor 109a, an output buffer circuit 109c that outputs the pulse generated by the PWM conversion circuit 109b, without changing the logic thereof, and a logic inversion circuit 109d that outputs the pulse generated by the PWM conversion circuit 109b, in such a way that the logic of the pulse is inverted. A pulse-width modulation signal PWM generated by the buffer circuit 109c is smoothed by an integral circuit 191 provided in the engine control circuit 100A, so that an analogue signal voltage corresponding to the output voltage of the variable resistor 109a is reproduced.

A window comparator 192 generates a first detection signal PS1, in the case where the gearshift lever is in the neutral position and the output voltage of the integral circuit 191 is within a first predetermined bandwidth, or in the case where the transmission is an automatic type, the gearshift lever is in the parking position, and the output voltage of the integral circuit 191 is within a second predetermined bandwidth. However, a delay gate circuit 193 prohibits the first detection signal PS1 from being generated at least within a predetermined time from a time instant when the power switch 103a is turned on.

The integral circuit 191, the window comparator 192, and the delay gate circuit 193 configure a first detection circuit 194; the first detection circuit 194 generates the desired first detection signal PS1 so as to drive the safety driving transistor 135A to turn on, via the logical sum circuit 195 and the driving resistor 139.

A prohibition transistor 136 is connected with the base terminal of the safety driving transistor 135A. The prohibition transistor 136 is turned on and driven through a during-driving signal DR2 generated by the microprocessor 110A, via a driving resistor 137; when the engine has been started and is already being rotating, the prohibition transistor 136 turns on to make the safety driving transistor 135A nonconductive. When the microprocessor 110A is not in the operation mode, a stability resistor 138 connected between the base terminal and the emitter terminal of the prohibition transistor 136 makes the prohibition transistor 136 nonconductive so that the prohibition transistor 136 does not hinder the safety driving transistor 135A from being turned on.

At least one of or both the pulse-width modulation signal PWM and the logic inverted signal PWN generated by the gearshift sensor 109A are inputted to the microprocessor 110A so that a pulse duty, which is a ratio of the pulse-train ON-width to the pulse period, is calculated; when the pulse duty is within the first predetermined band width or the second predetermined band width that is preliminarily stored in the program memory 111A, the second detection signal PS2 is generated so that the safety driving transistor 135A is driven to turn on, via the logical sum circuit 195. In the case where the pulse-width modulation signal PWM or the logic inverted signal PWN is inputted to the microprocessor 110A and breakage of a signal lead wire, a short-to-ground fault, or a short-to-power fault occurs, a detected pulse duty becomes the same as or smaller than a predetermined lower limit value, or the same as or larger than a predetermined limit value, so that the abnormality is detected; as a result, when an abnormality occurs, fail-safe processing is performed.

In contrast, in the case where both the pulse-width modulation signal PWM and the logic inverted signal PWN are inputted to the microprocessor 110A, even when there exists an abnormality in one of the respective signal lead wires for the pulse-width modulation signal PWM and the logic inverted signal PWN, the second detection signal PS2 can be generated through the other one of the signal lead wires. Even when the control voltage Vcc (=5V) abnormally decreases and hence the microprocessor 110A becomes inoperative, the gearshift sensor 109A and the first detection circuit 194 still maintain normal operation; for example, as long as the control voltage Vcc is the same as or higher than DC 3V, the gearshift sensor 109A and the first detection circuit 194 normally operate.

The engine control apparatus according to Embodiment 1 is configured as described above. Next, the operation of the engine control apparatus will be explained.

Figure 3:
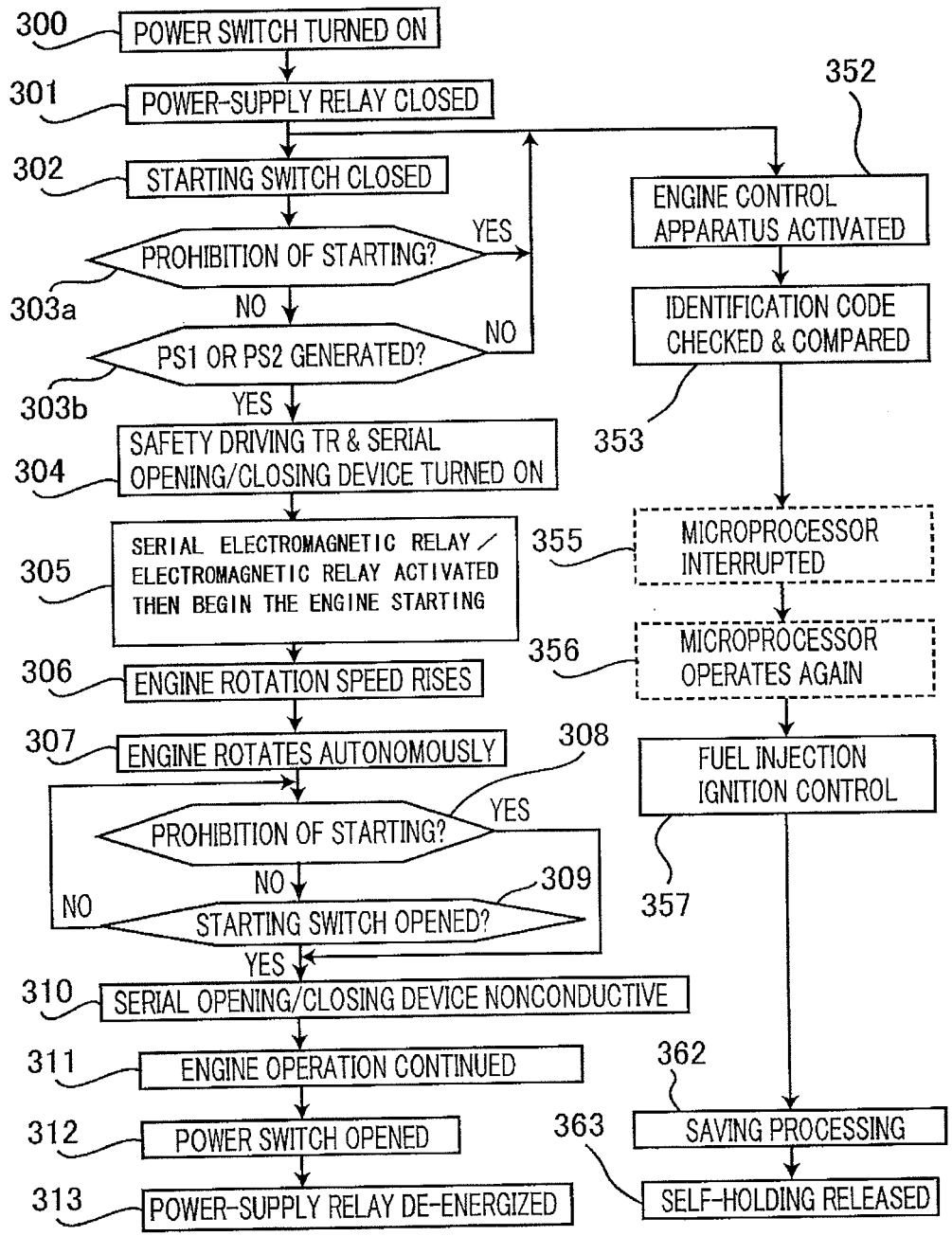
FIG. 3 is a flowchart for explaining the concept of direct starting by an engine control apparatus according to Embodiment 1 of the present invention.

FIG. 3 is a conceptual flowchart representing the direct starting of the apparatus illustrated in FIG. 1. In FIG. 3, in the step 300, the power switch 103a is closed; then, in the step 301, the driving transistor 121 is supplied with a base current via the driving resistors 122a and 122b and the diode 123. As a result, the power supply relay 102 is energized, whereby power supply to the engine control apparatus 100A is started.

In the step 352, the microprocessor 110A is supplied with electric power by the control power supply unit 120 to start its operation; thus, the starter motor 104 and the group of electric loads 108 can be driving-controlled in response to the operation states of the group of input sensors 107, the power switch on/off state monitoring signal PWS, the starting command monitoring signal STS, the contact operation monitoring signal MNT, and an indirect starting signal RMT and the contents of the input/output control program stored in the program memory 111A. In the step 353, the microprocessor 110A performs identification and comparison of an identification code.

In the step 302 following the step 301, after a vehicle driver puts the gearshift lever in the neutral position or the parking position, the starting switch 103b is closed; then, in the step 303a, the microprocessor 110A is in a standby mode for determining whether or not to move to the step 303b in response to the operation state of the prohibition transistor 144.

In the step 303a, when the microprocessor 110A operates in the step 353, and the identification code is not identified or the conduction prohibition command output STP that corresponds to the engine rotation speed outputs a conduction prohibition output, the result of the determination becomes "Yes", and then, the step 302 is resumed, where decrease in the engine rotation speed or matching in the identification is waited for. In the case where the engine rotation speed sufficiently decreases or the identification is established, the result of the determination becomes "NO", and then the step 303a is followed by the step 303b.

However, in the case where, due to decrease in the voltage of the vehicle battery 101, the microprocessor 110A cannot operate, the prohibition transistor 144 is made nonconductive because of a pull-down resistor 146; therefore, because the foregoing case is equivalent to the case where the result of the determination in the step 303a in FIG. 3 becomes "NO", the step 303a is followed by the step 303b. Even in this case, when the identification is not established in the step 356 described later, starting prohibition is immediately implemented, and neither fuel injection nor ignition control is implemented.

In the step 303b, when at least one of the first detection signal PS1 and the second detection signal PS2 occurs, and hence it is ascertained that the gearshift lever is in the neutral position or in the parking position, the result of the determination becomes "YES", and then the step 303b is followed by the step 304; in the case where neither the first detection signal PS1 nor the second detection signal PS2 occurs, the result of the determination becomes "NO", and then the step 302 is resumed.

In the step 304, the safety driving transistor 135A and the serial switching element 130 are turned on, and in the step 305, the serial electromagnetic relay 106 and the electromagnetic relay 105 operate, so that the starter motor 104 starts driving the engine.

When, under the condition that the remaining capacity of the vehicle battery 101 is small, the starter motor 104 starts driving the engine in the step 305, there may occur a case where the generated voltage of the vehicle battery 101 abnormally decreases and hence the microprocessor 110A stops its operation, as represented in the step 355. However, when the engine rotation speed rises in the step 306, the supply current to the starter motor 104 decreases, and hence the generated voltage of the vehicle battery 101 recovers and rises. As a result, as represented in the step 365, the microprocessor 110A resumes its operation, and in the step 357, fuel injection control and ignition control are started.

As a result, as represented in the step 307, the engine starts autonomous rotation.

In the step 308, the conduction prohibition command output STP is generated in response to whether or not the engine rotation speed has exceeded a predetermined value corresponding to an idling rotation speed; in the case where the engine rotation speed has exceeded the predetermined value, the result of the determination becomes "YES", and the step 308 is followed by the step 310; in the case where the engine rotation speed has not exceeded the predetermined value, the result of the determination becomes "NO", and the step 308 is followed by the step 309.

In the step 309, it is determined whether or not the starting switch 103b has been opened; in the case where the starting switch 103b has not been opened, the result of the determination becomes "NO", and the step 308 is resumed; in the case where the starting switch 103b has been opened, the result of the determination becomes "YES", and the step 309 is followed by the step 310.

In the step 310, the serial switching element 130 is turned off to de-energize the electromagnetic relay 105, whereby the engine maintains autonomous rotation.

In the step 311, the operation of the engine is continued; then, when the power switch 103a is opened in the step 312, the microprocessor 110A performs power-saving processing in the step 362. After that, in the step 363, the self-holding driving command DR1 is interrupted. As a result, in the step 313, the power supply relay 102 is de-energized, so that power supply to the engine control apparatus 100A is interrupted.

Next, the operation of the microprocessor in the engine control apparatus according to Embodiment 1 will be explained with reference to a flowchart in FIGS. 4A and 4B.

Figure 4A:
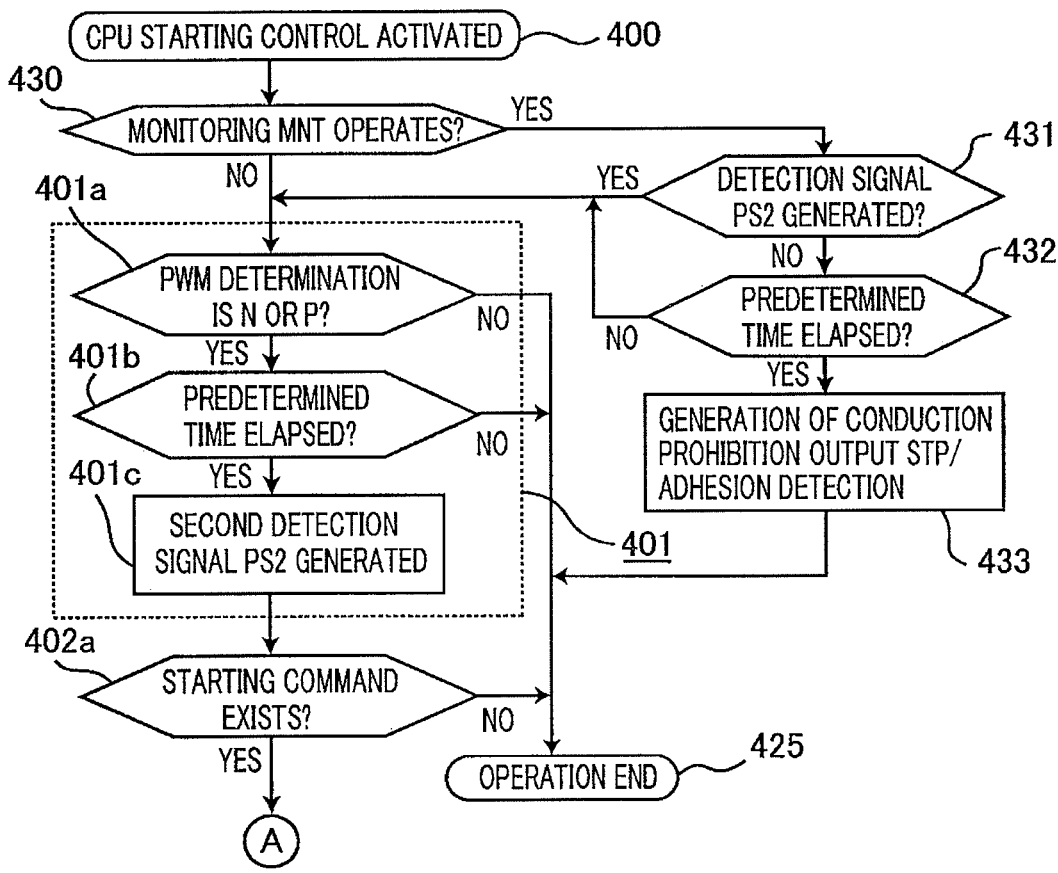
FIGS. 4A and 4B configure a flowchart for explaining the operation of a microprocessor in an engine control apparatus according to Embodiment 1 of the present invention.
Figure 4B:
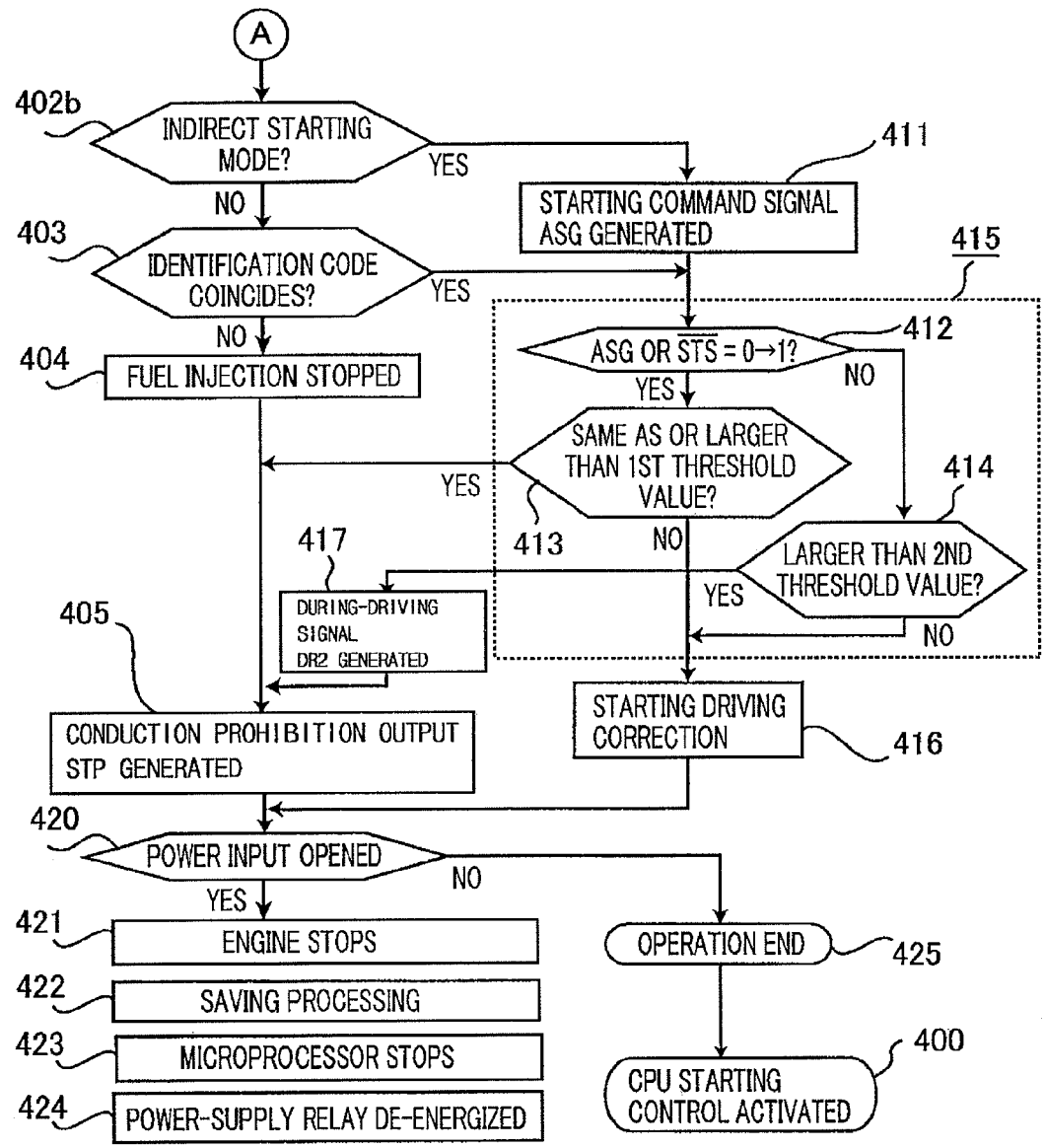

In FIGS. 4A and 4B, the step 400 is a step where the operation, of the microprocessor 110A, related to engine starting control starts. In the step 430 which is a determination step, the operation state of the contact operation monitoring signal MNT is monitored; in the case where the input logic level is "L", it is determined that the second output contact 106a is closed (the result of the determination becomes "YES") and the step 430 is followed by the step 431; in the case where the input logic level is "H", the result of the determination becomes "NO", and the step 430 is followed by the step 401a.

In the step 431 which is a determination step, it is determined whether or not the second detection signal PS2 is being generated; in the case where the second detection signal PS2 is being generated, the result of the determination becomes "YES", and the step 431 is followed by the step 401a; in the case where the second detection signal PS2 is not being generated, the result of the determination becomes "NO", and the step 431 is followed by the step 432.

In the step 432 which is a determination step, it is determined whether the determination "NO" in the step 431 has continued, for example, for 0.1 sec. or longer; in the case where the determination "NO" has not continued for 0.1 sec. or longer, the result of the determination becomes "NO", and the step 432 is followed by the step 401a; in the case where the determination "YES" has continued for 0.1 sec. or longer, the result of the determination becomes "YES", and the step 432 is followed by the step 433. In addition, when the step 432 is implemented for the first time, driving of an unillustrated timer is started; in the process in which circulation operation of the steps 432, 401a, 425, 400, 430, 431, and 432 is implemented, when a predetermined time, for example 0.1 sec. elapses, time counting is ended and the result of the determination becomes "YES", and then the step 432 is followed by the step 433; in the case where the result of the determination in the step 401 becomes "YES" before the time counting is ended, the step 401a is followed by the step 401b. When the result of the determination in the step 432 or the step 401 becomes "YES", driving of the timer that has been driven in the step 432 is interrupted, whereby the counting present value is reset.

The "YES" determination in the step 432 suggests that it has been confirmed that the second detection signal PS2 is not generated, and it has been determined that the gearshift lever is neither in the neutral position nor in the parking position; therefore, in the normal condition, the serial electromagnetic relay 106 is not energized. However, in the case where the first detection signal PS1 is generated and hence the serial electromagnetic relay 106 is energized, or in the case where, although the first detection signal PS1 is not generated, the second output contact 106a is adherently closed, the result of the determination in the step 430 becomes "YES"; therefore, via the steps 431 and 432, the step 430 is followed by the step 433, where the conduction prohibition command output STP is generated so as to prevent the electromagnetic relay 105 from being energized and adhesion abnormality information for the second output contact 106a is generated, and then the step 433 is followed by the operation end step 425.

In the case where the selection position of the transmission is neither in the neutral position nor in the parking position, the first detection signal is not generated; therefore, because the engine is not started, it can be omitted to generate the conduction prohibition command output STP in the step 433. Immediately after driving is started, the first and second detection signals PS1 and PS2 are not generated due to the delay gate circuit 193 (refer to FIG. 2) or the step 401b described later; therefore, the detection, in the process from the step 430 to the step 431, of adhesion abnormality of the output contact 106a is definitely implemented immediately after driving is started.

In the step 401a which is a determination step, the ON-duty and OFF-duty of the inputted pulse-width modulation signal PWM or the logic inverted signal PWN are calculated and compared with first and second duties stored in the program memory 111A; in the case where it is determined that the gearshift lever is in the neutral position or in the parking position, the result of the determination becomes "YES", and the step 401a is followed by the step 401b; in the case where it is determined that the gearshift lever is in another position such as a forward position or a reverse position, the result of the determination becomes "NO", and the step 401a is followed by the operation end step 425. The step 401a includes a time delay as a filter function corresponding to the delay gate circuit 193.

In the step 401b which is a determination step that serves as a delay processing means, only when the microprocessor 110A initially operates immediately after driving is started, it is determined whether or not the determination "YES" in the step 401a has continued for a predetermined time, for example, approximately 0.1 sec.; in the case where the determination "YES" in the step 401a has continued for the predetermined time, the result of the determination becomes "YES", and the step 401b is followed by the step 401c; in the case where the determination "YES" in the step 401a has not continued for the predetermined time, the result of the determination becomes "NO", and the step 401b is followed by the operation end step 425.

In the step 401c, the second detection signal PS2 is generated, and the step 401c is followed by the step 402a. In addition, when the step 401b is implemented for the first time, driving of an unillustrated timer is started; in the process in which circulation operation of the steps 401b, 425, 400, 430, 401a, and 401b is implemented, when a predetermined time, for example 0.1 sec. elapses, time counting is ended and the result of the determination becomes "YES", and then the step 401b is followed by the step 401c; after the result of the determination in the step 401b becomes "YES", the timer that has been driven in the step 401b maintains the state of the "YES" determination until the microprocessor 110A is restarted. The process block 401 configured with the steps 401a, 401b, and 401c serves as the second detection means.

The step 402a is a step where, by determining the logic states of the starting command monitoring signal STS and the indirect starting signal RMT in FIG. 1, it is determined whether or not a starting command exists; in the case where the starting command does not exist, the result of the determination becomes "NO", and the step 402a is followed by the operation end step 425; in the case where the starting command exists, the result of the determination becomes "YES", and the step 402a is followed by the step 402b. In the operation end step 425, other control programs are performed; within a predetermined time after that, the operation start step 400 is resumed, and the process from the step 400 to the step 425 is repeatedly and circularly performed.

In the step 402b which is a determination step, in the case where the determination in the step 402a whether or not the starting command exists indicates the indirect starting signal RMT, the results of the determination becomes "YES", and the step 402B is followed by the step 411; in the case where the determination in the step 402a whether or not the starting command exists indicates the starting command monitoring signal STS, the results of the determination becomes "NO", and the step 402b is followed by the step 403.

In the step 403 which is a determination step, in accordance with the fact that the determination in the step 402b indicates not the indirect starting mode but the direct starting mode through the vehicle starting switch 103b, an identification code added to the operation key 103 is read by means of the reading device 103c, and the identification code and the inherent code 406 stored in the program memory 111A are compared with each other; in the case where the result of the determination in the step 403 becomes "YES", the step 403 is followed by the step 412; in the case where the result of the determination in the step 403 becomes "NO", the step 403 is followed by the step 404, where fuel injection is interrupted.

In the step 405 which is a step where the conduction prohibition command output STP is generated when the determination in the step 403 indicates that identification is not established or when it is determined, in the step 413 or 414 described later, that the engine is rotating, and the prohibition transistor 144, which is auxiliary switching element, is turned on, so that the conduction driving transistor 134 and the serial switching element 130 are made nonconductive to de-energize the electromagnetic relay 105.

In the step 411, the indirect starting command output ASG is generated, and the step 411 is followed by the step 412. In the step 412 which is a determination step, it is determined whether or not the logic level of the indirect starting command output ASG has effectively changed from "L" to "H", or whether or not the logic level of the starting command monitoring signal STS has effectively changed from "H" to "L"; in the case where either one of these signals has effectively changed, the step 412 is followed by the step 413; in the case where neither one of these signals has effectively changed, the step 412 is followed by the step 414.

In the step 413 which is a determination step, the rotation speed of the engine and a first threshold-value rotation speed are compared with each other; as long as the engine is rotating, the result of the determination becomes "YES", and the step 413 is followed by the step 405, where the conduction prohibition command output STP is generated; in the case where the engine is not rotating, the result of the determination becomes "NO", and the step 413 is followed by the step 416.

In the step 414 which is a determination step, in the case where the engine rotation speed and a second threshold-value rotation speed are compared with each other; in the case where the engine is in the idling state, the result of the determination becomes "YES", and the step 414 is followed by the step 417; in the case where the engine does not autonomously rotate, the result of the determination becomes "NO", and the step 414 is followed by the step 416.

In the step 417, the during-driving signal DR2 is generated; then, the step 417 is followed by the step 405, where the conduction prohibition command output STP is generated. The process block 415 configured with the steps 412 to 414 serves as the double-starting prohibition means.

The step 416 serves as a starting driving correction means that increases the fuel injection amount or delays the ignition timing so as to raise the startability of the engine when the engine control apparatus 100A has an ignition control function.

In the step 420 that is carried out after the step 405 or the step 416, it is determined whether or not the power switch 103a has been opened so that the logic level of the power switch on/off state monitoring signal PWS becomes "H"; in the case where it is determined that the power switch 103a has been opened, the step 420 is followed by the step 421; in the case where it is determined that the power switch 103a is kept closed, the step 420 is followed by the operation end step 425; then, after a predetermined time, the operation start step 400 is resumed in a circulating manner.

The step 421 is a step where fuel injection or ignition control is interrupted and hence the engine stops. In the step 422, the microprocessor 110A performs saving processing for various kinds of data pieces; for example, various kinds of abnormality occurrence information items are transferred and stored in an unillustrated nonvolatile data memory.

In the step 423, the microprocessor 110A performs saving processing for various kinds of data pieces; in the step 424, the power supply relay 102 is de-energized so that power supply to the electronic control apparatus 100A is ended. It may be possible that a self-holding command for the driving transistor 121 is cancelled after it is determined that the microprocessor 110A has stopped, by, instead of the self-holding driving command DR1, monitoring the pulse width of a watchdog signal generated by the microprocessor 110A.

As described above, the engine control apparatus 100A according to Embodiment 1 is provided with the microprocessor 110A that drives and controls the group of electric loads 108 including the electromagnetic relay 105 that drives at least the starter motor 104 of an engine, in response to the operation state of the group of input sensors 107 including the engine starting switch 103b and the gearshift sensor 109A that creates position information on the gearshift lever of a vehicle transmission and to the contents of a control program stored in the nonvolatile program memory 111A. Furthermore, in the engine control apparatus 100A, there are utilized the first detection circuit 194 that detects at least one or both of the state where the transmission is in the neutral position and the state where the transmission is in the parking position, based on the position information on the gearshift lever generated by the gearshift sensor 109A, and generates the first detection signal PS1; and the second detection means 401 in which the position information is inputted to a calculation means; there are detected at least one or both of the state where the transmission is in the neutral position and the state where the transmission is in the parking position; and then the microprocessor 110A generates the second detection signal PS2.

When at least one of the first detection signal PS1 and the second detection signal PS2 are outputted because the neutral position or the parking position is detected, the starter motor 104 is supplied with electric power by the vehicle battery 101, via the output contact 105a of the electromagnetic relay 105 that is energized via the direct driving circuit 141 connected in series with the starting switch 103b.

The direct driving circuit 141 continues to energize the electromagnetic relay 105 even when, due to an abnormal decrease in the voltage of the vehicle battery 101, the microprocessor 110A is not operative; even though the second detection signal PS2 is not generated, the engine is started as long as the first detection signal PS1 is generated.

In the engine control apparatus 100A according to Embodiment 1, there are provided the microprocessor 110A that drives and controls the starter motor 104 for an engine and the direct driving circuit 141 that enables an engine to be started even when the microprocessor 110A is inoperative, and detection of the gearshift-lever position by the gearshift sensor 109A is performed by means of a double system utilizing the first detection signal PS1 and the second detection signal PS2.

Accordingly, the electromagnetic relay 105 that drives the starter motor 104 is continued to be energized even when, due to an abnormal decrease in the voltage of the vehicle battery 101, the microprocessor 110A is not operative; and even though the second detection signal PS2, which depends on the operation of the microprocessor 110A, is not generated, the first detection signal PS1, which does not depend on the operation of the microprocessor 110A, makes it possible to safely and securely start an engine. Therefore, there is demonstrated an effect in which the safety in starting an engine can be enhanced.

The gearshift sensor 109A not only generates a signal voltage corresponding to the selection position of the gearshift lever of the transmission, but also outputs at least one or both of the predetermined-period pulse-width modulation signal PWM having an ON-width in proportion to the signal voltage and the logic inverted signal PWN, which is a signal obtained by inverting the logic of the pulse-width modulation signal PWM.

The first detection circuit 194 is configured with the integral circuit 191 that smoothes at least one or both of the pulse-width modulation signal PWM and the logic inverted signal PWN, which is a signal obtained by inverting the logic of the pulse-width modulation signal PWM, so as to reproduce the signal voltage corresponding to the selection position of the gearshift lever of the transmission; and the window comparator 192 that detects at least one or both of the state where the transmission is in the neutral position and the state where the transmission is in the parking position, based on whether the reproduced signal voltage is within the first predetermined bandwidth or within the second predetermined bandwidth, and that generates the first detection signal PS1. The first detection circuit 194 is incorporated in the engine control apparatus 100A, regardless of whether or not the engine control apparatus 100A is utilized along with a transmission control apparatus.

The second detection means 401 calculates the duties, which are each the ratio of an ON-pulse width or an OFF-pulse width to the pulse period, of at least one or both of the pulse-width modulation signal PWM and the logic inverted signal PWN, which is a signal obtained by inverting the logic of the pulse-width modulation signal PWM, compares the calculated duty values with preliminarily stored duty values that vary depending on whether the transmission gearshift lever is in the neutral position or in the parking position, and detects at least one or both of the state where the transmission is in the neutral position and the state where the transmission is in the parking position, so that the microprocessor 110A generates the second detection signal PS2. The second detection means 401 is performed by the microprocessor 110A incorporated in the engine control apparatus 100A, regardless of whether or not the engine control apparatus 100A is utilized along with a transmission control apparatus.

That is to say, in the engine control apparatus 100A according to Embodiment 1, the gearshift sensor 109A generates the pulse-width modulation signal PWM corresponding to the position of the gearshift lever, and both the first detection circuit 194 formed of hardware and the second detection means 401 formed of software detect the state where the transmission is in the neutral position or the state where the transmission is in the parking position.

Accordingly, it is made possible to accurately detect with a few signal lines the neutral position or the parking position, which has a bandwidth, and there is demonstrated an effect in which the safety can be enhanced by a double-system detection means.

The microprocessor 110A can directly receive the pulse-width modulation signal PWM; therefore, there is demonstrated an effect in which no AD conversion processing is required.

Furthermore, in the case where the engine control apparatus 100A is utilized along with a transmission control apparatus, there is demonstrated an effect in which, by utilizing at least one of the first detection circuit 194 and the second detection means 401 along with the engine control apparatus 100A, an inexpensive downsized control apparatus can be obtained.

The first detection circuit 194 is further provided with the delay gate circuit 193 that prohibits the first detection signal PS1 from being generated at least within a predetermined time from a time instant when the power switch is turned on; the second detection means 401 is further provided with the delay processing means 401b that prohibits the second detection signal PS2 from being generated at least within a predetermined time from a time instant when the power switch is turned on.

In other words, in the engine control apparatus 100A according to Embodiment 1, the first detection signal PS1 and the second detection signal PS2 operate in such a way as to prohibit the engine from being started within a predetermined time from a time instant when the power switch is turned on.

Accordingly, there is demonstrated an effect in which an erroneous operation due to a response delay in the gearshift sensor 109A and its signal processing circuit is prevented, whereby the safety can be raised.

The starter motor 104 is supplied with electric power via the serial electromagnetic relay 106 having the second output contact 106a connected in series with the output contact 105a of the electromagnetic relay 105; the excitation coil 106b that energizes the serial electromagnetic relay 106 is driven via the safety driving transistor 135A that is driven to turn on through the first detection signal PS1 or the second detection signal PS2; at least after the engine has been started, the safety driving transistor 135A is prohibited from being turned on.

That is to say, in the engine control apparatus 100A according to Embodiment 1, the output contact 106a of the serial electromagnetic relay 106 that is driven when the transmission is in the neutral position or in the parking position is connected in series with the starter motor 104.

In the case where there occurs an adhesion abnormality in the output contact 105a of the electromagnetic relay 105 that drives the starter motor 104 when the engine starting switch 103b is closed, or in the case where the output contact 105a is intentionally and forcibly closed, when the gearshift lever is put into a driving position other than the neutral position and the parking position, the output contact 105a of the serial electromagnetic relay 105 is closed and hence supply of electric power to the starter motor 104 is interrupted; therefore, because the vehicle cannot be driven by the starter motor 104, there is demonstrated an effect in which not only is the safety raised, but also theft prevention function can be enhanced.

Moreover, there is demonstrated an effect in which, after the engine has been started, the serial electromagnetic relay 105 is prohibited from operating and hence wear and tear due to unnecessary operation is suppressed, so that electric power can be saved.

The voltage at the connection point between the second output contact 106a and the output contact 105a of the electromagnetic relay 105 is inputted, as the contact operation monitoring signal MNT, to the microprocessor 110A via the interface circuit 161; in the case where, when the second detection signal PS2 is not generated, the contact operation monitoring signal MNT occurs, the microprocessor 110A detects the adhesion abnormality in the second output contact 106a and prohibits driving the excitation coil 105b that energizes the electromagnetic relay 105.

That is to say, in the engine control apparatus 100A according to Embodiment 1, in the case where, when the second output contact 106a of the serial electromagnetic relay 106, which is driven when the transmission is in the neutral position or in the parking position, is in the state of an adhesion abnormality or intentionally closed, the electromagnetic relay 105, which operates when the engine starting switch 103b is closed, is prohibited from operating.

Therefore, in the case where, even though the gearshift lever is put into a driving position other than the neutral position and the parking position, the second output contact 106a of the serial electromagnetic relay 106 is closed, the electromagnetic relay 105 that operates in response to the engine starting switch 103b becomes inoperative so that supply of electric power to the starter motor 104 is interrupted; therefore, there is demonstrated an effect in which not only is the safety raised, but also theft prevention function can be enhanced.

There are provide the reading device 103c for an identification code added to the operation key 103 for the starting switch 103b, the serial switching element 130, and the auxiliary switching element 144; the program memory 111A further incorporates the comparison determination means 403 and a program that serves as the fuel-injection interruption means 404.

The serial switching element 130 is a transistor that is connected in series with the excitation coil 105b of the electromagnetic relay 105 that connects the vehicle battery 101 with the engine starter motor 104 and is turned on when the starting switch 103b is closed, thereby starting the engine.

The comparison determination means 403 compares an identification code inputted to the microprocessor 110A with an inherent code stored in the program memory 111A and generates a comparison determination output.

The fuel-injection interruption means 404 interrupts driving of a fuel-injection electromagnetic valve, in response to the fact that it has been determined by the comparison determination means 403 that the coincidence of the codes is not established.

The auxiliary switching element 144 prohibits the serial switching element 130 from being turned on, in response to the fact that it has been determined by the comparison determination means 403 that the coincidence of the codes is not established; when the microprocessor 110A is inoperative, the auxiliary switching element 144 is biased not to hinder the serial switching element 130 from being turned on.

That is to say, in the engine control apparatus 100A according to Embodiment 1, even when the microprocessor 110A has not completed determination of identification code coincidence, engine can rapidly be started; even when, due to start of engine cranking by the starter motor 104, the voltage of the vehicle battery decreases and hence the microprocessor 110A becomes inoperative, the cranking is maintained. After that, when, due to rise in the engine rotation speed, the supply current to the starter motor 104 decreases and hence the voltage of the vehicle battery recovers, the microprocessor 110A resumes its operation and hence fuel injection and ignition control are performed, whereby the engine autonomously rotates. In the case where the result of comparison and determination by the comparison determination means 403 becomes "non-coincidence", fuel injection is interrupted.

Accordingly, even in the case of cold-weather starting in which the remaining capacity of the vehicle battery is small, there is demonstrated an effect in which, even when the microprocessor 110A once becomes inoperative, starting is continues, whereby the engine is readily started.

Even when an identification code is not authenticated and, due to a failure in conduction prohibition circuit, the serial switching element 130 cannot be opened, or even when the excitation coil 105b of the electromagnetic relay 105 is directly supplied with electric power through an external leas wire and hence the starter motor 104 rotates, the engine does not autonomously rotate, because fuel injection has been interrupted.

The program memory 111A further incorporates a control program that serves as a double-starting prohibition means 415. The double-starting prohibition means 415 calculates the present engine rotation speed, by measuring the interval or the density of a pulse signal that is outputted from the engine rotation sensor and inputted to the microprocessor 110A, and prohibits the restarting of the rotating engine and excessive starting driving in such a way that, when the calculated engine rotation speed is the same as or higher than a first threshold value, engine starting is prohibited, or when the calculated engine rotation speed exceeds a second threshold value that is larger than the first threshold value, there is generated the conduction prohibition command output STP for forcibly interrupting the serial switching element 130 to be turned on, even when the engine has already been started and operated.

That is to say, in the engine control apparatus 100A according to Embodiment 1, there is provided the double-starting prohibition means 415 that monitors the engine rotation speed and prohibits starting of the rotating engine.

Accordingly, it is made possible to nullify starting operation for the rotating engine and to prevent the starter motor 104 from excessively rotating; therefore, in particular, there is demonstrated an effect in which indirect starting operation can safely be performed without utilizing the starting switch 103b.

Embodiment 2

Next, an engine control apparatus according to Embodiment 2 will be explained. With regard to Embodiment 2, what differ from Embodiment 1 will mainly be explained.

Figure 5:
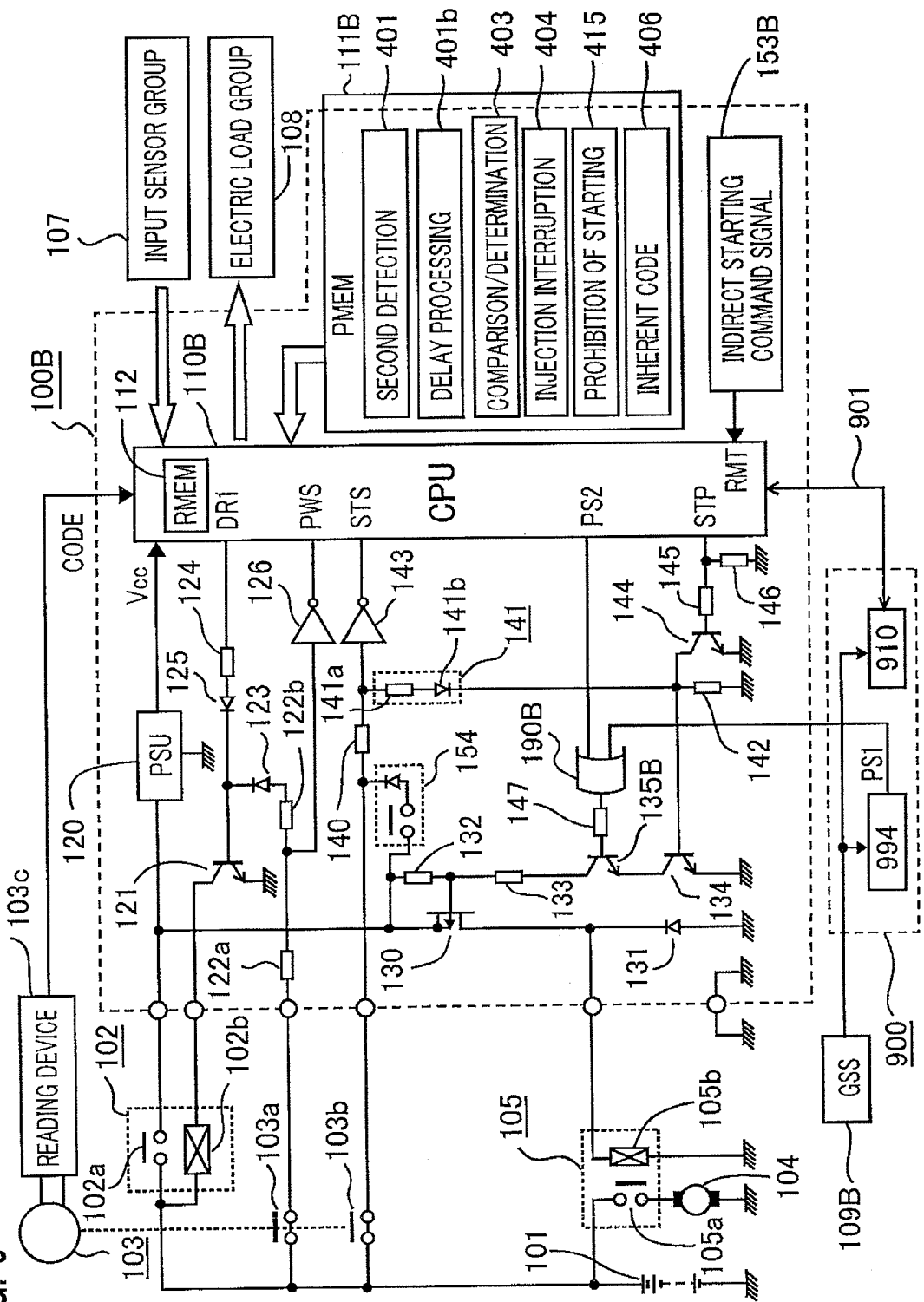
FIG. 5 is a circuit block diagram for explaining an engine control apparatus according to Embodiment 2 of the present invention.

FIG. 5 is a circuit block diagram for explaining an engine control apparatus according to Embodiment 2; the same reference characters denote constituent elements that are the same as or equivalent to those in Embodiment 1.

In FIG. 5, an engine control apparatus 100B, which is supplied with electric power by the vehicle battery 101 via the power supply relay 102, is provided with a program memory 111B and a microprocessor 110B that collaborates with the program memory 111B. In the program memory 111B, there are stored inherent code data 406 for identifying an identification code, and a control program, to be explained with reference to FIG. 7, that forms a comparison determination means 703, a fuel-injection interruption means 704, a double-starting prohibition means 715, a second detection means 701, and a delaying processing means 701b, in addition to an input/output control program as the engine control apparatus 100B.

An indirect starting command input 154 is connected in parallel with the starting switch 103b and is an alternative signal of the indirect starting command output ASG in FIG. 1. However, when the indirect starting command input 154 is closed, an indirect starting command circuit 153B input the indirect starting signal RMT.

A transmission control apparatus 900 that incorporates a microprocessor 910 and a first detection circuit 994 obtains gearshift lever position information from a gearshift sensor 109B, generates the first detection signal PS1, and output the first detection signal PS1 to the engine control apparatus 100B; the transmission control apparatus 900 also generates the second detection signal PS2 and transmits the second detection signal PS2 to the engine control apparatus 100B via a communication line 901, and the microprocessor 110B outputs the second detection signal PS2.

In addition, the power switch 103a, the starting switch 103b, the starter motor 104, the electromagnetic relay 105, the group of input sensors 107, the group of electric loads 108, the power supply relay 102, and the like are connected in the same manner as those in FIG. 1; however, the serial electromagnetic relay 106 is removed, and a safety driving transistor 135B is provided in the gate circuit of the serial switching element 130. Via a driving resistor 147, the safety driving transistor 135B is driven to turn on by a logical sum circuit 190B that receives, as inputs, the first detection signal PS1 and the second detection signal PS2. In this regard however, the safety driving transistor 135B can be connected in series between the serial switching element 130 and the excitation coil 105b. The contact operation monitoring signal MNT, which is, in FIG. 1, inputted to the microprocessor 110A through the interface circuit 161, is also removed.

Figure 6:
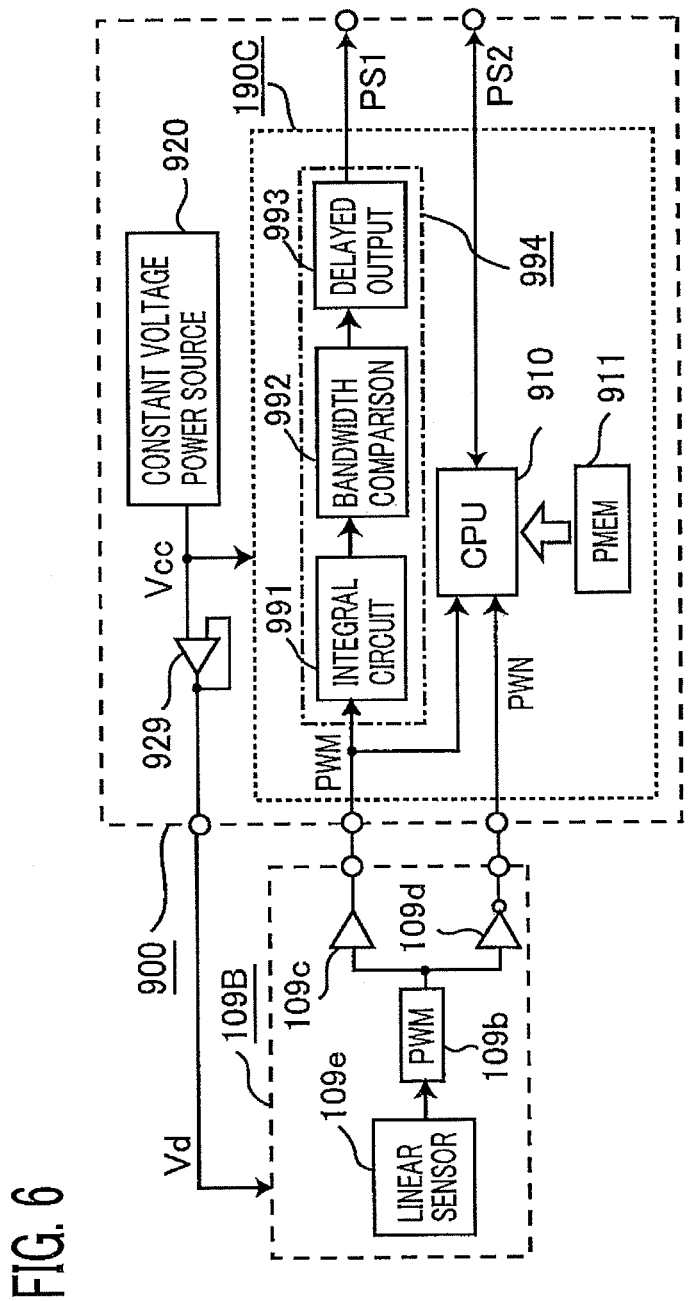
FIG. 6 is a partially detailed diagram related to signal processing by a gearshift sensor in an engine control apparatus according to Embodiment 2 of the present invention.

Next, signal processing by the gearshift sensor for the engine control apparatus according to Embodiment 2 will be explained with reference to FIG. 6, i.e., a partial detailed diagram. In FIG. 6, the transmission control apparatus 900 supplies the gearshift sensor 109B with the sensor driving voltage Vd via a buffer amplification 929 provided in the output circuit of a control power supply unit 920 that is supplied with electric power by the vehicle battery 101 and generates the stabilized control voltage Vcc. The buffer amplification 929 protects the control power supply unit 920 from being damaged when the power-supply lead wire for driving the gearshift sensor undergoes earth-fault abnormality.

The gearshift sensor 109B is configured with a linear sensor 109e that generates a signal voltage corresponding to the selection position of the gearshift lever, the PWM conversion circuit 109b that generates a constant-cycle pulse train signal having an ON-width in proportion to the output voltage of the linear sensor 109e, an output buffer circuit 109c that outputs the pulse generated by the PWM conversion circuit 109b, without changing the logic thereof, and a logic inversion circuit 109d that outputs the pulse generated by the PWM conversion circuit 109b, in such a way that the logic of the pulse is inverted.

A pulse-width modulation signal PWM generated by the buffer circuit 109c is smoothed by an integral circuit 991 provided in the transmission control apparatus 900, so that an analogue signal voltage corresponding to the output voltage of the linear sensor 109e is reproduced.

A window comparator 992 generates a first detection signal PS1, in the case where the gearshift lever is in the neutral position and the output voltage of the integral circuit 991 is within a first predetermined bandwidth, or in the case where the transmission is an automatic type, the gearshift lever is in the parking position, and the output voltage of the integral circuit 991 is within a second predetermined bandwidth. However, a delay gate circuit 993 prohibits the first detection signal PS1 from being generated at least within a predetermined time from a time instant when the power switch 103a is turned on.

The integral circuit 991, the window comparator 992, and the delay gate circuit 993 configure a first detection circuit 994; the first detection circuit 994 generates the desired first detection signal PS1 so as to drive the safety driving transistor 135B to turn on, via the logical sum circuit 190B (refer to FIG. 5).

At least one of or both the pulse-width modulation signal PWM and the logic inverted signal PWN generated by the gearshift sensor 109B are inputted to the microprocessor 910 so that a pulse duty, which is a ratio of the pulse-train ON-width to the pulse period, is calculated; when the pulse duty is within the first predetermined band width or the second predetermined band width that is preliminarily stored in the program memory 911, the second detection signal PS2 is generated so that the safety driving transistor 135B is driven to turn on, via the communication line 901, the microprocessor 110B (refer to FIG. 5), and the logical sum circuit 190B.

In the case where the pulse-width modulation signal PWM or the logic inverted signal PWN is inputted to the microprocessor 910 and breakage of a signal lead wire, a short-to-ground fault, or a short-to-power fault occurs, a detected pulse duty becomes the same as or smaller than a predetermined lower limit value, or the same as or larger than a predetermined limit value, so that the abnormality is detected; as a result, when an abnormality occurs, fail-safe processing is performed.

In contrast, in the case where both the pulse-width modulation signal PWM and the logic inverted signal PWN are inputted to the microprocessor 910, even when there exists an abnormality in one of the respective signal lead wires for the pulse-width modulation signal PWM and the logic inverted signal PWN, the second detection signal PS2 can be generated through the other one of the signal lead wires.

An unillustrated accelerator position sensor that detects an accelerator-pedal depressing degree, a vehicle speed sensor, and a plurality of linear solenoids for putting the transmission gearshift lever into one of the multi-step forward positions, the reverse position, the parking position, or the neutral position are connected to the transmission control apparatus 900; in the case of the forward position, a transmission gear ratio is selected in a controlled manner, in response to the accelerator-pedal depressing degree and the vehicle speed.

In order to make the microprocessor 910 perform transmission control, gearshift lever positional information from the gearshift sensor 109B is important; in the case where there occurs an abnormality in the microprocessor 910, a backup circuit enables, for example, a forward driving of the third-speed ratio, the reverse driving, the parking operation, and the neutral operation, based on the position information, detected by means of hardware, on the forward, the reverse, the parking, or the neutral position.

The first detection signal PS1 outputted to the engine control apparatus 100B is obtained by logically adding a parking position signal and a neutral position signal that are obtained through the first detection circuit 994. However, instead of outputting the first detection signal PS1 to the engine control apparatus 100B, a first detection circuit may be provided in the engine control apparatus 100B, as is the case where, as illustrated in FIG. 2, the first detection circuit 194 is provided in the engine control apparatus 100A. In this case, by inputting the first detection signal PS1 detected by the engine control apparatus 100B and comparing the first detection signal PS1 with the second detection signal PS2 transmitted from the transmission control apparatus 900, it can be determined whether or not any abnormality exists in the transmission control apparatus 900 or the communication line 901.

The engine control apparatus according to Embodiment 2 is configured in such a manner as described above. Next, the operation of the microprocessor in the engine control apparatus, especially, the difference between Embodiment 1 and Embodiment 2 will be explained with reference to a flowchart in FIG. 7.

In FIG. 7, the step 700 is a step where the operation, of the microprocessor 110B, related to engine starting control starts. In the step 701a where it is determined whether or not the second detection signal PS2 from the transmission control apparatus 900 has been received via the communication line 901, in the case where the second detection signal PS2 has not been received, the result of the determination becomes "NO", and the step 701a is followed by the operation end step 725; in the case where the second detection signal PS2 has been received, the result of the determination becomes "YES", and the step 701a is followed by the step 701b.

In the step 701b which is a determination step, only when the microprocessor 110B initially operates immediately after driving is started, it is determined whether or not the determination "YES" in the step 701a has continues for a predetermined time, for example, approximately 0.1 sec.; in the case where the determination "YES" in the step 701a has continued for the predetermined time, the result of the determination becomes "YES", and the step 701b is followed by the step 701c; in the case where the determination "YES" in the step 701a has not continued for the predetermined time, the result of the determination becomes "NO", and the step 701b is followed by the operation end step 725.

In the step 701c, the second detection signal PS2 is generated, and the step 701c is followed by the step 702a. In addition, when the step 701b is implemented for the first time, driving of an unillustrated timer is started; in the process in which circulation operation of the steps 701b, 725, 700, 701a, and 701b is implemented, when a predetermined time, for example 0.1 sec. elapses, time counting is ended and the result of the determination becomes "YES", and then the step 701b is followed by the step 701c; after the result of the determination in the step 701b becomes "YES", the timer that has been driven in the step 701b maintains the state of the "YES" determination until the microprocessor 110B is restarted.

The process block 701 configured with the steps 701a, 701b, and 701c serves as the second detection means; however, what actually detects the second detection signal PS2 is the microprocessor 910 in the transmission control apparatus 900.

In the process from the steps 702a to 725, the same operation as that in the process from the steps 402a to 425 in FIG. 4 is performed; the steps having numbers in 400s are replaced by the steps having numbers in 700s. In this regard however, in FIG. 7, the step 711 corresponding to the step 411 in FIG.

4 does not exist. The reason for that is that, in the case of FIG. 1, indirect starting is performed through the indirect starting command output ASG, but, in the case of FIG. 5, the microprocessor 110B is not required to generate the indirect starting command output ASG because a starting command is generated based on the indirect starting command input 154, and hence it is only required to monitor the indirect starting signal RMT obtained from the indirect starting command circuit 153B and to perform determination processing in the step 702b. In addition, the step 717 corresponding to the step 417 in FIG. 4 does not exist; therefore, the microprocessor 110B does not generate the during-driving signal DR2.

As described above, the engine control apparatus 100B according to Embodiment 2 is provided with the microprocessor 110B that drives and controls the group of electric loads 108 including the electromagnetic relay 105 that drives at least engine starter motor 104, in response to the operation state of the group of input sensors 107 including the engine starting switch 103b and the gearshift sensor 109B that creates position information on the gearshift lever of a vehicle transmission and to the contents of a control program stored in the nonvolatile program memory 111B. Furthermore, in the engine control apparatus 100B, there are utilized the first detection circuit 994 that detects at least one or both of the state where the transmission is in the neutral position and the state where the transmission is in the parking position, based on the position information on the gearshift lever generated by the gearshift sensor 109B, and generates the first detection signal PS1; and the second detection means 701 in which the position information is inputted to a calculation means; there are detected at least one or both of the state where the transmission is in the neutral position and the state where the transmission is in the parking position; and then the microprocessor 110B generates the second detection signal PS2.

When at least one of the first detection signal PS1 and the second detection signal PS2 are outputted because the neutral position or the parking position is detected, the starter motor 104 is supplied with electric power by the vehicle battery 101, via the output contact 105a of the electromagnetic relay 105 that is energized via the direct driving circuit 141 connected in series with the starting switch 103b.

The direct driving circuit 141 continues to energize the electromagnetic relay 105 even when, due to an abnormal decrease in the voltage of the vehicle battery 101, the microprocessor 110B is not operative; even though the second detection signal PS2 is not generated, the engine is started as long as the first detection signal PS1 is generated.

That is to say, in the engine control apparatus 100B according to Embodiment 2, as is the case with Embodiment 1, there are provided the microprocessor 110B that drives and controls the starter motor 104 for an engine and the direct driving circuit 141 that enables an engine to be started even when the microprocessor 110B is inoperative; detection of the gearshift-lever position by the gearshift sensor 109B is performed by means of a double system utilizing the first detection signal PS1 and the second detection signal PS2.

Accordingly, the electromagnetic relay 105 that drives the starter motor 104 is continued to be energized even when, due to an abnormal decrease in the voltage of the vehicle battery 101, the microprocessor 110B is not operative; and even though the second detection signal PS2, which depends on the operation of the microprocessor 110B, is not generated, the first detection signal PS1, which does not depend on the operation of the microprocessor 110B, makes it possible to safely and securely start an engine. Therefore, there is demonstrated an effect in which the safety in starting an engine can be enhanced.

The gearshift sensor 109B not only generates a signal voltage corresponding to the selection position of the gearshift lever of the transmission, but also outputs at least one or both of the predetermined-period pulse-width modulation signal PWM having an ON-width in proportion to the signal voltage and the logic inverted signal PWN, which is a signal obtained by inverting the logic of the pulse-width modulation signal PWM.

The first detection circuit 994 is configured with the integral circuit 991 that smoothes at least one or both of the pulse-width modulation signal PWM and the logic inverted signal PWN, which is a signal obtained by inverting the logic of the pulse-width modulation signal PWM, so as to reproduce the signal voltage corresponding to the selection position of the gearshift lever of the transmission; and the window comparator 992 that detects at least one or both of the state where the transmission is in the neutral position and the state where the transmission is in the parking position, based on whether the reproduced signal voltage is within the first predetermined bandwidth or within the second predetermined bandwidth, and that generates the first detection signal PS1. In the case where the engine control apparatus 100B is utilized along with the transmission control apparatus 900, the first detection circuit 994 is incorporated in the transmission control apparatus 900 and transmits the first detection signal PS1 to the engine control apparatus 100B.

The second detection means 701 calculates the duties, which are each the ratio of an ON-pulse width or an OFF-pulse width to the pulse period, of at least one or both of the pulse-width modulation signal PWM and the logic inverted signal PWN, which is a signal obtained by inverting the logic of the pulse-width modulation signal PWM, compares the calculated duty values with preliminarily stored duty values that vary depending on whether the transmission gearshift lever is in the neutral position or in the parking position, and detects at least one or both of the state where the transmission is in the neutral position and the state where the transmission is in the parking position, so that the microprocessor 110B generates the second detection signal PS2. As far as the second detection means is concerned, in the case where the engine control apparatus 100B is utilized along with the transmission control apparatus 900, the second detection signal PS2 that is calculated and detected by the microprocessor 910 incorporated in the transmission control apparatus 900 is transmitted to the engine control apparatus 100B via the communication line 901.

That is to say, in the engine control apparatus 100B according to Embodiment 2, as is the case with Embodiment 1, the gearshift sensor 109B generates the pulse-width modulation signal PWM corresponding to the position of the gearshift lever, and both the first detection circuit 994 formed of hardware and the second detection means 701 formed of software detect the state where the transmission is in the neutral position or the state where the transmission is in the parking position.

Accordingly, it is made possible to accurately detect with a few signal lines the neutral position or the parking position, which has a bandwidth, and there is demonstrated an effect in which the safety can be enhanced by a double-system detection means.

The microprocessor 110B can directly receive the pulse-width modulation signal PWM; therefore, there is demonstrated an effect in which no AD conversion processing is required.

Furthermore, in the case where the engine control apparatus 100B is utilized along with a transmission control apparatus, there is demonstrated an effect in which, by utilizing at least one of the first detection circuit 994 and the second detection means 701 along with the engine control apparatus 100B, an inexpensive downsized control apparatus can be obtained.

The first detection circuit 994 is further provided with the delay gate circuit 993 that prohibits the first detection signal PS1 from being generated at least within a predetermined time from a time instant when the power switch is turned on; the second detection means 701 is further provided with the delay processing means 701b that prohibits the second detection signal PS2 from being generated at least within a predetermined time from a time instant when the power switch is turned on.

In other words, in the engine control apparatus 100B according to Embodiment 2, as is the case with Embodiment 1, the first detection signal PS1 and the second detection signal PS2 operate in such a way as to prohibit the engine from being started within a predetermined time from a time instant when the power switch is turned on.

Accordingly, there is demonstrated an effect in which an erroneous operation due to a response delay in the gearshift sensor 109B and its signal processing circuit is prevented, whereby the safety can be raised.

There are provide the reading device 103c for an identification code added to the operation key 103 for the starting switch 103b, the serial switching element 130, and the auxiliary switching element 144; the program memory 111B further incorporates the comparison determination means 703 and a program that serves as the fuel-injection interruption means 704.

The serial switching element 130 is a transistor that is connected in series with the excitation coil 105b of the electromagnetic relay 105 that connects the vehicle battery 101 with the engine starter motor 104 and is turned on when the starting switch 103b is closed, thereby starting the engine.

The comparison determination means 703 compares an identification code inputted to the microprocessor 110B with an inherent code stored in the program memory 111B and generates a comparison determination output.

The fuel-injection interruption means 704 interrupts driving of a fuel-injection electromagnetic valve, in response to the fact that it has been determined by the comparison determination means 703 that the coincidence of the codes is not established.

The auxiliary switching element 144 prohibits the serial switching element 130 from being turned on, in response to the fact that it has been determined by the comparison determination means 703 that the coincidence of the codes is not established; when the microprocessor 110B is inoperative, the auxiliary switching element 144 is biased not to hinder the serial switching element 130 from being turned on.

That is to say, in the engine control apparatus 100B according to Embodiment 2, as is the case with Embodiment 1, even when the microprocessor 110B has not completed determination of identification code coincidence, engine can rapidly be started; even when, due to start of engine cranking by the starter motor 104, the voltage of the vehicle battery decreases and hence the microprocessor 110B becomes inoperative, the cranking is maintained. After that, when, due to rise in the engine rotation speed, the supply current to the starter motor 104 decreases and hence the voltage of the vehicle battery recovers, the microprocessor 110B resumes its operation and hence fuel injection and ignition control are performed, whereby the engine autonomously rotates. In the case where the result of comparison and determination by the comparison determination means 703 becomes "non-coincidence", fuel injection is interrupted.

Accordingly, even in the case of cold-weather starting in which the remaining capacity of the vehicle battery is small, there is demonstrated an effect in which, even when the microprocessor 110B once becomes inoperative, starting is continues, whereby the engine is readily started.

Even when an identification code is not authenticated and, due to a failure in conduction prohibition circuit, the serial switching element 130 cannot be opened, or even when the excitation coil 105b of the electromagnetic relay 105 is directly supplied with electric power through an external leas wire and hence the starter motor 104 rotates, the engine does not autonomously rotate, because fuel injection has been interrupted.

There is provided the safety driving transistor 135B connected in series between the serial switching element 130 and the excitation coil 105b or connected in series with the driving circuit for the serial switching element 130; the safety driving transistor 135B is driven to turn on through the first detection signal PS1 or the second detection signal PS2, and can supply the excitation coil 105b with electric power when the gearshift lever of the transmission is in any one of the neutral position and the parking position.

That is to say, in the engine control apparatus 100B according to Embodiment 2, the safety driving transistor 135B that operates in response to the first detection signal PS1 or the second detection signal PS2 is connected in series with the excitation coil 105b of the electromagnetic relay 105 that operates in response to the starting switch 103b, or connected in series with the driving circuit of the serial switching element 130.

Accordingly, no serial electromagnetic relay is not required; therefore, there is demonstrated an effect in which the safety in starting an engine can be enhanced with an inexpensive circuit configuration.

The program memory 111B further incorporates a control program that serves as a double-starting prohibition means 715. The double-starting prohibition means 715 calculates the present engine rotation speed, by measuring the interval or the density of a pulse signal that is outputted from the engine rotation sensor and inputted to the microprocessor 110B, and prohibits the restarting of the rotating engine and excessive starting driving in such a way that, when the calculated engine rotation speed is the same as or higher than a first threshold value, engine starting is prohibited, or when the calculated engine rotation speed exceeds a second threshold value that is larger than the first threshold value, there is generated the conduction prohibition command output STP for forcibly interrupting the serial switching element 130 to be turned on, even when the engine has already been started and operated.

That is to say, in the engine control apparatus 100B according to Embodiment 2, there is provided the double-starting prohibition means 715 that monitors the engine rotation speed and prohibits starting of the rotating engine.

Accordingly, it is made possible to nullify starting operation for the rotating engine and to prevent the starter motor 104 from excessively rotating; therefore, in particular, there is demonstrated an effect in which indirect starting operation can safely be performed without utilizing the starting switch 103b.

Various modifications and alterations of this invention will be apparent to those skilled in the art without departing from the scope and spirit of this invention, and it should be understood that this is not limited to the illustrative embodiments set forth herein.

What is claimed is:

1. An engine control apparatus, comprising
a microprocessor that drives and controls a group of electric loads including an electromagnetic relay that drives at least a starter motor for an engine, in response to an operation state of a group of input sensors including a starting switch for the engine and a gearshift sensor that creates position information on a gearshift lever of a vehicle transmission and to contents of a control program stored in a program memory;
a first detection circuit that detects at least one or both of a state where the transmission is in a neutral position and a state where the transmission is in a parking position, based on the position information on the gearshift lever generated by the gearshift sensor, and that generates a first detection signal;
a second detection means in which there are detected at least one or both of the state where the transmission is in the neutral position and the state where the transmission is in the parking position, based on the position information, and then the microprocessor generates a second detection signal;
wherein the first detection circuit is a signal processing circuit that is operated with a lower power-source voltage than the microprocessor;
wherein the first and second detection signals perform circuit-closing drive of a safety driving transistor, by way of a logical sum circuit;
wherein the starter motor is energized and driven by a vehicle battery when the starting switch is manually closed and then the safety driving transistor is closed;
wherein the safety driving transistor energizes an excitation coil of a serial electromagnetic relay that drives a second output contact connected in series with an output contact of the electromagnetic relay that is energized by way of a direct driving circuit when the starting switch is closed, or the safety driving transistor is connected in series with a driving circuit for a serial opening/closing device connected in series with the excitation coil of the electromagnetic relay or is connected in series with the serial opening/closing device itself; and
wherein the direct driving circuit is a circuit that, instead of an indirect starting command output generated by the microprocessor, energizes the electromagnetic relay when the starting switch is manually closed, regardless of the operation state of the microprocessor.

2. The engine control apparatus according to claim 1, where
in that the gearshift sensor not only generates a signal voltage corresponding to a selection position of the gearshift lever of the transmission, but also outputs at least one or both of a predetermined-period pulse-width modulation signal having an ON-width in proportion to the signal voltage and a logic inverted signal, which is a signal obtained by inverting the logic of the pulse-width modulation signal,
in that the first detection circuit is configured with an integral circuit that smoothes at least one or both of the pulse-width modulation signal and the logic inverted signal, which is a signal obtained by inverting the logic of the pulse-width modulation signal, so as to reproduce the signal voltage corresponding to a selection position of the gearshift lever of the transmission; and a window comparator that detects at least one or both of the state where the transmission is in the neutral position and the state where the transmission is in the parking position, based on whether the reproduced signal voltage is within a first predetermined bandwidth or within a second predetermined bandwidth, and that generates the first detection signal,
in that the first detection circuit being incorporated in the engine control apparatus regardless of whether or not the engine control apparatus is utilized along with the transmission control apparatus, or in that the first detection circuit being incorporated in the transmission control apparatus when the engine control apparatus is utilized along with the transmission control apparatus, and transmitting the first detection signal to the engine control apparatus,
in that the second detection means calculates the duties, which are each the ratio of an ON-pulse width or an OFF-pulse width to the pulse period, of at least one or both of the pulse-width modulation signal and the logic inverted signal, which is a signal obtained by inverting the logic of the pulse-width modulation signal, compares the calculated duty values with preliminarily stored duty values that vary depending on whether the transmission gearshift lever is in the neutral position or in the parking position, and detects at least one or both of the state where the transmission is in the neutral position and the state where the transmission is in the parking position so as to output the second detection signal through the microprocessor,
in that the second detection signal is calculated and detected by the second detection means of the microprocessor incorporated in the engine control apparatus regardless of whether or not the engine control apparatus is utilized along with the transmission control apparatus, or
in that the second detection means transmits through a communication line to the engine control apparatus the second detection signal that is calculated and detected by the microprocessor incorporated in the transmission control apparatus in the case where the engine control apparatus is utilized along with the transmission control apparatus.

3. The engine control apparatus according to claim 1, where
in that a voltage at the connection point between the second output contact of the serial electromagnetic relay and the output contact of the electromagnetic relay is inputted, as a contact operation monitoring signal, to the microprocessor; and in the case where, when the second detection signal is not generated, the contact operation monitoring signal is generated, the microprocessor prohibits driving of the excitation coil that energizes the electromagnetic relay.

4. The engine control apparatus according to claim 1, further comprising
a reading device that reads an identification code added to an operation key for the starting switch and inputs the identification code to the microprocessor;
a serial switching element that is connected in series with the excitation coil of the electromagnetic relay and turns on so as to start the engine when the starting switch is closed;
a comparison determination means that compares an inherent code stored in the program memory with an identification code inputted from the reading device to the microprocessor and generates a comparison determination output;

a fuel-injection interruption means that interrupts fuel injection, in response to a fact that the comparison determination means determines that coincidence has not been established; and an auxiliary switching element that prohibits the serial switching element from being turned on, in response to a fact that the comparison determination means determines that coincidence has not been established, and is biased not to hinder the serial switching element from being turned on when the microprocessor is inoperative.

5. The engine control apparatus according to claim 3, where in that the program memory includes a control program that calculates a present engine rotation speed, by measuring an interval or a density of a pulse signal that is inputted to the microprocessor from an engine rotation sensor, and prohibits restarting of the engine which is in a rotation mode and excessive starting driving in such a way that, when the calculated engine rotation speed is the same as or higher than a first threshold value, engine starting is prohibited, or when the calculated engine rotation speed exceeds a second threshold value that is larger than the first threshold value, there is generated the conduction prohibition command output for forcibly interrupting the serial switching element to be turned on so as to interrupt starting of the engine, even when the engine has already been started and operated.

6. An engine control apparatus, comprising a microprocessor that drives and controls a group of electric loads including an electromagnetic relay that drives at least a starter motor for an engine, in response to an operation state of a group of input sensors including a starting switch for the engine and a gearshift sensor that creates position information on a gearshift lever of a vehicle transmission and to contents of control program stored in a program memory;

a first detection circuit that detects at least one or both of a state where the transmission is in a neutral position and a state where the transmission is in a parking position, based on the position information on the gearshift lever generated by the gearshift sensor, and that generates a first detection signal;

a second detection means in which there are detected at least one or both of the state where the transmission is in the neutral position and the state where the transmission is in the parking position, based on the position information, and then the microprocessor generates a second detection signal; and a direct driving circuit that is connected in series with the starting switch and energizes the electromagnetic relay so that a vehicle battery supplies the starter motor with electric power when at least one of the first detection signal and the second detection signal are outputted because the neutral position or the parking position is detected, the engine control apparatus being characterized in that the direct driving circuit continues to energize the electromagnetic relay even when, due to an abnormal decrease in the voltage of the vehicle battery, the microprocessor is inoperative, and starts the engine as long as the first detection signal is generated, even when the second detection signal is not generated;

in that the gearshift sensor not only generates a signal voltage corresponding to a selection position of the gearshift lever of the transmission, but also outputs at least one or both of a predetermined-period pulse-width modulation signal having an ON-width in proportion to the signal voltage and a logic inverted signal, which is a signal obtained by inverting the logic of the pulse-width modulation signal, in that the first detection circuit is configured with an integral circuit that smoothes at least one or both of the pulse-width modulation signal and the logic inverted signal, which is a signal obtained by inverting the logic of the pulse-width modulation signal, so as to reproduce the signal voltage corresponding to a selection position of the gearshift lever of the transmission; and a window comparator that detects at least one or both of the state where the transmission is in the neutral position and the state where the transmission is in the parking position, based on whether the reproduced signal voltage is within a first predetermined bandwidth or within a second predetermined bandwidth, and that generates the first detection signal, in that the first detection circuit being incorporated in the engine control apparatus regardless of whether or not the engine control apparatus is utilized along with the transmission control apparatus, or in that the first detection circuit being incorporated in the transmission control apparatus when the engine control apparatus is utilized along with the transmission control apparatus, and transmitting the first detection signal to the engine control apparatus, in that the second detection means calculates the duties, which are each the ratio of an ON-pulse width or an OFF-pulse width to the pulse period of at least one or both of the pulse-width modulation signal and the logic inverted signal, which is a signal obtained by inverting the logic of the pulse-width modulation signal, compares the calculated duty values with preliminarily stored duty values that vary depending on whether the transmission gearshift lever is in the neutral position or in the parking position, and detects at least one or both of the state where the transmission is in the neutral position and the state where the transmission is in the parking position so as to output the second detection signal through the microprocessor, in that the second detection signal is calculated and detected by the second detection means of the microprocessor incorporated in the engine control apparatus regardless of whether or not the engine control apparatus is utilized along with the transmission control apparatus, or in that the second detection means transmits through a communication line to the engine control apparatus the second detection signal that is calculated and detected by the microprocessor incorporated in the transmission control apparatus in the case where the engine control apparatus is utilized along with the transmission control apparatus, and in that the first detection circuit is provided with a delay gate circuit that prohibits the first detection signal from being generated at least within a predetermined time from a time instant when a power switch is turned on; and the second detection means is provided with a delay processing means that prohibits the second detection signal from being generated at least within a predetermined time from a time instant when the power switch is turned on.

* * * * *